(12) United States Patent
Ramchandani

(10) Patent No.: US 11,074,611 B2
(45) Date of Patent: Jul. 27, 2021

(54) CUSTOMER RELATIONSHIP MANAGEMENT SYSTEM FOR PHYSICAL LOCATIONS

(71) Applicant: Maplebear Inc., San Francisco, CA (US)

(72) Inventor: Jayant Ramchandani, Fremont, CA (US)

(73) Assignee: Maplebear, Inc., San Francisco, CA (US)

( * ) Notice: Subject to any disclaimer, the term of this patent is extended or adjusted under 35 U.S.C. 154(b) by 1158 days.

(21) Appl. No.: 14/086,636

(22) Filed: Nov. 21, 2013

(65) Prior Publication Data

US 2014/0156380 A1 Jun. 5, 2014

Related U.S. Application Data

(60) Division of application No. 10/352,750, filed on Jan. 27, 2003, now Pat. No. 8,600,804, which is a continuation-in-part of application No. 10/290,008, filed on Nov. 7, 2002, now Pat. No. 7,962,361.

(51) Int. Cl.
| | |
|---|---|
| *G06Q 30/00* | (2012.01) |
| *G06Q 30/02* | (2012.01) |
| *G07C 9/28* | (2020.01) |
| *G07C 11/00* | (2006.01) |

(52) U.S. Cl.
CPC ......... *G06Q 30/0255* (2013.01); *G06Q 30/02* (2013.01); *G06Q 30/0211* (2013.01); *G06Q 30/0242* (2013.01); *G07C 9/28* (2020.01); *G07C 2011/02* (2013.01)

(58) Field of Classification Search
CPC .......................................... G06Q 30/00–0284

USPC .............................................. 705/14.1–14.73
See application file for complete search history.

(56) References Cited

U.S. PATENT DOCUMENTS

| | | | |
|---|---|---|---|
| 4,614,861 A | 9/1986 | Pavlov et al. |
| 4,634,845 A | 1/1987 | Hale et al. |
| 4,667,087 A | 5/1987 | Quintana |
| 4,924,075 A | 5/1990 | Tanaka |
| 5,038,251 A | 8/1991 | Sugiyama et al. |
| 5,072,380 A | 12/1991 | Randelman et al. |

(Continued)

FOREIGN PATENT DOCUMENTS

| | | |
|---|---|---|
| EP | 1189462 A1 | 3/2002 |
| WO | WO 97/23838 | 7/1997 |

(Continued)

OTHER PUBLICATIONS

Asthana, et al., "An indoor wireless system for personalized shopping assistance", Workshop on Mobile Computing Systems and Applications, 1994, pp. 1-8 (Year: 1994).*

(Continued)

*Primary Examiner* — John Van Bramer
(74) *Attorney, Agent, or Firm* — Fenwick & West LLP

(57) ABSTRACT

A method and computer program product for managing information about transactions occurring in a physical establishment includes gathering information about multiple transactions at a physical establishment, and storing the information as metadata. A byte stream corresponding to the metadata is generated. Several elements of the metadata are associated with a particular session based on predefined criteria.

20 Claims, 34 Drawing Sheets

(56) References Cited

U.S. PATENT DOCUMENTS

| | | | |
|---|---|---|---|
| 5,170,046 A | 12/1992 | Kusakabe | |
| 5,295,064 A | 3/1994 | Malec et al. | |
| 5,317,330 A | 5/1994 | Everett et al. | |
| 5,539,395 A | 7/1996 | Buss et al. | |
| 5,569,903 A | 10/1996 | Matsubara | |
| 5,629,981 A | 5/1997 | Nerlikar | |
| 5,642,485 A | 6/1997 | Deaton et al. | |
| 5,649,114 A | 7/1997 | Deaton et al. | |
| 5,862,222 A | 1/1999 | Gunnarsson | |
| 5,870,030 A | 2/1999 | DeLuca et al. | |
| 5,898,738 A | 4/1999 | Nagata et al. | |
| 5,955,021 A | 9/1999 | Tiffany, III | |
| 6,025,780 A | 2/2000 | Bowers et al. | |
| 6,116,505 A | 9/2000 | Withrow | |
| 6,282,516 B1 | 8/2001 | Giuliani | |
| 6,313,745 B1 | 11/2001 | Suzuki | |
| 6,317,718 B1 | 11/2001 | Fano | |
| 6,327,570 B1 | 12/2001 | Stevens | |
| 6,354,493 B1 | 3/2002 | Mon | |
| 6,360,208 B1 | 3/2002 | Ohanian et al. | |
| 6,370,513 B1 | 4/2002 | Kolawa et al. | |
| 6,487,180 B1 | 11/2002 | Borgstahl et al. | |
| 6,507,279 B2 | 1/2003 | Loof | |
| 6,509,829 B1 | 1/2003 | Tuttle | |
| 6,513,015 B2 | 1/2003 | Ogasawara | |
| 6,522,264 B1 | 2/2003 | Stewart | |
| 6,523,752 B2 | 2/2003 | Nishitani et al. | |
| 6,529,880 B1 | 3/2003 | McKeen et al. | |
| 6,546,257 B1 | 4/2003 | Stewart | |
| 6,546,374 B1 | 4/2003 | Esposito et al. | |
| 6,554,187 B2 | 4/2003 | Otto | |
| 6,587,835 B1* | 7/2003 | Treyz | G06Q 20/12 705/14.64 |
| 6,600,418 B2 | 7/2003 | Francis et al. | |
| 6,611,206 B2 | 8/2003 | Eshelman et al. | |
| 6,657,543 B1 | 12/2003 | Chung | |
| 6,659,344 B2 | 12/2003 | Otto et al. | |
| 6,671,358 B1 | 12/2003 | Seidman et al. | |
| 6,677,858 B1 | 1/2004 | Faris et al. | |
| 6,813,609 B2 | 11/2004 | Wilson | |
| 6,837,427 B2 | 1/2005 | Overhultz et al. | |
| 7,006,982 B2 | 2/2006 | Sorensen | |
| 7,010,501 B1 | 3/2006 | Roslak et al. | |
| 7,079,571 B1 | 7/2006 | Chen | |
| 7,295,115 B2 | 11/2007 | Aljadeff et al. | |
| 7,619,522 B2 | 11/2009 | Geissler | |
| 7,864,051 B2 | 1/2011 | Paradiso et al. | |
| 7,886,981 B2 | 2/2011 | Morita | |
| 7,932,813 B2 | 4/2011 | O'Byrne et al. | |
| 7,962,361 B2 | 6/2011 | Ramchandani et al. | |
| 7,965,188 B2 | 6/2011 | Geissler | |
| 8,020,775 B2 | 9/2011 | Mullen et al. | |
| 8,054,160 B2 | 11/2011 | Corrado et al. | |
| 8,229,787 B2 | 7/2012 | Ramchandani et al. | |
| 8,266,465 B2 | 9/2012 | Hardman et al. | |
| 8,274,372 B2 | 9/2012 | Fujino | |
| 8,374,159 B2 | 2/2013 | Roberts et al. | |
| 8,382,000 B2 | 2/2013 | Mullen et al. | |
| 8,471,685 B2 | 6/2013 | Shingai | |
| 8,489,451 B2 | 7/2013 | Ramchandani | |
| 8,600,804 B2 | 12/2013 | Ramchandani et al. | |
| 8,766,780 B2 | 7/2014 | Graczyk et al. | |
| 9,317,823 B2 | 4/2016 | Muirhead | |
| 9,436,899 B2 | 9/2016 | Haar et al. | |
| 9,641,693 B2 | 5/2017 | Ritter | |
| 2001/0021915 A1* | 9/2001 | Cohen | G06Q 30/02 705/14.35 |
| 2001/0027439 A1 | 10/2001 | Holtzman et al. | |
| 2001/0049636 A1 | 12/2001 | Hudda et al. | |
| 2002/0010629 A1* | 1/2002 | Diamond | G06Q 30/0224 705/14.13 |
| 2002/0011519 A1 | 1/2002 | Shults, III | |
| 2002/0016740 A1* | 2/2002 | Ogasawara | G06Q 30/0226 705/26.1 |
| 2002/0038267 A1 | 3/2002 | Can et al. | |
| 2002/0065680 A1 | 5/2002 | Kojima et al. | |
| 2002/0077883 A1 | 6/2002 | Lancos et al. | |
| 2002/0077930 A1 | 6/2002 | Trubey et al. | |
| 2002/0082559 A1 | 6/2002 | Chang et al. | |
| 2002/0082859 A1 | 6/2002 | Lancos et al. | |
| 2002/0116209 A1 | 8/2002 | Tsuge | |
| 2002/0116266 A1* | 8/2002 | Marshall | G06Q 30/02 705/14.14 |
| 2002/0117544 A1 | 8/2002 | Wolf et al. | |
| 2002/0129063 A1 | 9/2002 | Kosak et al. | |
| 2002/0138432 A1 | 9/2002 | Makino et al. | |
| 2002/0147642 A1 | 10/2002 | Avallone et al. | |
| 2002/0165758 A1 | 11/2002 | Hind et al. | |
| 2002/0169714 A1 | 11/2002 | Ike et al. | |
| 2002/0170961 A1 | 11/2002 | Dickson et al. | |
| 2002/0174025 A1 | 11/2002 | Hind et al. | |
| 2002/0186133 A1 | 12/2002 | Loof | |
| 2002/0194081 A1 | 12/2002 | Perkowski | |
| 2003/0001009 A1 | 1/2003 | Collins et al. | |
| 2003/0055667 A1 | 3/2003 | Sgambaro et al. | |
| 2003/0055707 A1* | 3/2003 | Busche | G06Q 30/0601 705/14.65 |
| 2003/0097441 A1 | 5/2003 | Konomi | |
| 2003/0125929 A1 | 7/2003 | Bergstraesser et al. | |
| 2003/0150908 A1 | 8/2003 | Pokorny et al. | |
| 2003/0150909 A1 | 8/2003 | Markham et al. | |
| 2003/0154144 A1 | 8/2003 | Pokorny et al. | |
| 2003/0155415 A1 | 8/2003 | Markham et al. | |
| 2003/0158795 A1 | 8/2003 | Markham et al. | |
| 2003/0171956 A1 | 9/2003 | Cox et al. | |
| 2003/0174099 A1 | 9/2003 | Bauer et al. | |
| 2003/0177025 A1 | 9/2003 | Curkendall et al. | |
| 2003/0195812 A1 | 10/2003 | Nguyen | |
| 2004/0029569 A1 | 2/2004 | Khan et al. | |
| 2004/0036623 A1 | 2/2004 | Chung | |
| 2004/0044575 A1 | 3/2004 | Bakker et al. | |
| 2004/0153368 A1 | 8/2004 | Freishtat et al. | |
| 2005/0237160 A1 | 10/2005 | Nolan et al. | |
| 2006/0000900 A1 | 1/2006 | Fernandes et al. | |
| 2007/0013481 A1 | 1/2007 | Zhu et al. | |
| 2007/0027762 A1 | 2/2007 | Collins et al. | |
| 2007/0194935 A1 | 8/2007 | Ayala et al. | |
| 2008/0042850 A1 | 2/2008 | De Witte et al. | |
| 2008/0067526 A1 | 3/2008 | Chew | |
| 2008/0201264 A1 | 8/2008 | Brown et al. | |
| 2008/0266103 A1 | 10/2008 | Chen et al. | |
| 2009/0045251 A1 | 2/2009 | Jaiswal et al. | |
| 2009/0058614 A1 | 3/2009 | Roz | |
| 2009/0159701 A1 | 6/2009 | Mullen et al. | |
| 2009/0255996 A1 | 10/2009 | Brown et al. | |
| 2009/0309736 A1 | 12/2009 | Heurtier | |
| 2010/0056097 A1 | 3/2010 | Liebman | |
| 2011/0115685 A1 | 5/2011 | Chang | |
| 2011/0295415 A1 | 12/2011 | Bartlett et al. | |
| 2012/0313758 A1 | 12/2012 | Savarese et al. | |
| 2012/0316953 A1 | 12/2012 | Ramchandani et al. | |
| 2013/0119135 A1 | 5/2013 | Gauthier et al. | |
| 2014/0156380 A1 | 6/2014 | Ramchandani | |

FOREIGN PATENT DOCUMENTS

| | | |
|---|---|---|
| WO | WO 97/24689 A1 | 7/1997 |
| WO | WO 01/71582 A1 | 9/2001 |
| WO | WO 02/21424 A2 | 3/2002 |
| WO | WO 02/056212 A1 | 7/2002 |
| WO | WO 02/097699 A1 | 12/2002 |
| WO | 2004/044688 A2 | 5/2004 |

OTHER PUBLICATIONS

Canada NewsWire, Royal Bank and BC-based Emex Marketing Technologies Launch Loyalty Pilot Program for Visa Credit Cardholders, Aug. 31, 2000, p. 1.

Pentland, A. et al., "Face Recognition for Smart Environments," Computer, Feb. 2000, pp. 50-55, vol. 33, Issue 2.

Scharfeld, T.A., "An Analysis of the Fundamental Constraints on Low Cost Passive Radio-Frequency Identification System Design," Massachusetts Institute of Technology, Aug. 2001, pp. 1-115.

(56) References Cited

OTHER PUBLICATIONS

Archive of http://vivotech.com, [online] [Archived by http://archive.org on Nov. 28, 2001; Retrieved Sep. 4, 2006] Retrieved from the Internet<URL:http://web.archive.org/web/*/http://vivotech.com>.
"Royal Bank and BC-Based Ernex Marketing Technologies Launch Loyalty Pilot Program for Visa Credit Cardholders," Canada NewsWire, Aug. 31, 2000.
Kannan P.K. et al., "Wireless Commerce: Marketing Issues and Possibilities," Proceedings of the 34.sup.th Annual Hawaii International Conference on System Sciences, Jan. 2001, pp. 1-6.
AIM International, Inc., "Radio Frequency Identification RFID: A Basic Primer," AIM International WP-98/002R, Jul. 24, 1998, seventeen pages.
The International Search Report, PCT, dated Feb. 21, 2004 for International Application No. PCT/US03/35384.
Barr, V., "Transcendent Wave at Prada's SoHo epicenter, retail rises to a new level", Apr. 2002.
Crawford et al., "Forrester TechStrategy Report: 'Building Smarter Stores'", Aug. 2002.
Customer Loyalty, Texas Instruments Radio Frequency Identification Systems, 2 pages.
Gage, D. et al.: The Science of Desire, Baseline the Project Management Center, Dec. 16, 2002, pp. 1-17, Ziff Davis Media Inc.
Loyalty "Shopping Guide," National Petroleum News, Nov. 2002, pp. 1-16, Adams Business Media, Inc.
Reid, K., RFID Grows Some New Legs, National Petroleum News, Feb. 2001, pp. 1-8, Adams Business Media, Inc.
RFID Journal Learning From Prada web pages. RFID Journal Inc. (2003). Retrieved from the Internet: <URL:http://www.rfidjournal.com>, 5 pages.
Texas Instruments Integrity for You Introduces Personal Recognition. TM. Dining Loyalty Program Featuring RFID Technology From Texas Instruments and Transaction Management Technology From Commerce Systems web pages (online). Texas Instruments Radio Frequency Identification Systems. Retrieved from the Internet: <URL: http//www.ti.com/tiris/docs/news/news.sub.--releases/2002/re15-17-02.shtm-l>, 3 pages.
Texas Instruments Prada Personalizing Customer Experience at New York Epicenter Store Using Texas Instruments RFid Smart Labels web pages (Online). Texas Instruments Radio Frequency Identification Systems. Retrieved from the Internet: <URL: http://www.ti.com/tiris/docs/news/news.sub.--releases/2002/rel4-23-02.sht- ml>, 2 pages.
Texas Instruments Prada Uses Smart Tags to Personalize Shopping web pages (online). Texas Instruments Radio Frequency Identification Systems. Retrieved from the Internet: <URL: http://www.ti.com/tiris/docs/news/in.sub.--the.sub.--news/2002/04-24-02.s- html>, 3 pages.
Texas Instruments RFID Journal. RIFD System Aims to Promote Restaurant Loyalty web pages (online). Texas Instruments Radio Frequency Identification Systems. Retrieved from the Internet: <URL: http://www.ti.com/tiris/docs/news/in.sub.--the.sub.--news/2002/05-18-02.s- html> 2 pages.
Texas Instruments Tiris for Automatic Recognition of Consumers web pages (online). TIRIS Radio Frequency Identification Solutions. Retrieved from the Internet: <URL:http://web.archive.org/web/*/http://www.to.com/tiris/docs/docntr.- htm>, 8 pages.
United States Office Action, U.S. Appl. No. 10/352,750, dated Oct. 2, 2009, 12 pages.
United States Office Action, U.S. Appl. No. 10/352,750, dated Jul. 23, 2010, fourteen pages.
Canada NewsWire, "Royal Bank and BC-Based Emex Marketing Technologies Launch Loyalty Pilot Program for Visa Credit Cardholders," Aug. 31, 2000, pp. 1-4.
United States Office Action, U.S. Appl. No. 10/352,750, dated Mar. 13, 2013, 8 pages.
United States Office Action, U.S. Appl. No. 10/290,008, dated Dec. 1, 2009, 48 pages.
United States Office Action, U.S. Appl. No. 10/290,008, dated Jan. 9, 2009, 44 pages.
United States Office Action, U.S. Appl. No. 10/290,008, dated May 29, 2008, 41 pages.
United States Office Action, U.S. Appl. No. 10/290,008, dated Nov. 15, 2007, 36 pages.
United States Office Action, U.S. Appl. No. 10/290,008, dated Sep. 21, 2006, 14 pages.
United States Office Action, U.S. Appl. No. 13/101,932, dated Dec. 9, 2011, 17 pages.
United States Office Action, U.S. Appl. No. 13/919,724, dated Jan. 2, 2014, 8 pages.
"Complaint and Jury Demand," In the United States District Court for the District of Connecticut, Case No. 3:13-CV-01613-JBA, *Novitaz, Inc.* v. *Shopkick, Inc.*, Nov. 4, 2013, 4 pages.
"Defendant Shopkick, Inc.'s Answer and Counterclaims to Novitaz's Complaint," In the United States District Court for the District of Connecticut, Case No. 3:13-CV-01613- JBA, *Novitaz, Inc.* v. *Shopkick, Inc.*, Feb. 21, 2014, 10 pages.
"Plaintiff's Answer to Defendant's Counterclaims," In the United States District Court for the District of Connecticut, Case No. 3:13-CV-01613-JBA, *Novitaz, Inc.* v. *Shopkick, Inc.*, Mar. 14, 2014, 3 pages.
Asthana, et al., "An indoor wireless system for personalized shopping assistance", Workshop on Mobile Computing Systems and Applications, 1994.
PCT International Search Report, PCT Application No. PCT/US03/35384, dated May 26, 2004 (3 pages total).
U.S. District Court United States District Court for the District of Connecticut (New Haven) Civil Docket for Case#: 3:13-cv-01613-JBA, Aug. 8, 2014, 8 pages.
United States Patent and Trademark Office Before the Patent Trial and Appeal Board Decision Denying Institution of Inter Partes Review for Case IPR2015-00279, U.S. Pat. No. 8,229,787, May 29, 2015.
Vilma Barr, "Transcendent Wave at Prada's SoHo epicenter, retail rises to a new level", Apr. 2002. (cited in parent U.S. Appl. No. 10/290,008) (5 pages total).
Final Office Action for U.S. Appl. No. 13/919,724, dated Feb. 9, 2015.

\* cited by examiner

| Sample Restaurant Engagement Plan (for Service Provider) ||||
|---|---|---|---|
| Profile || Preferences ||
| Name | Ron Nelson | Seating | 1. Window - Table 11 |
| Zip Code | 94312 | | 2. Window - Table 15 |
| Status | Platinum | | 3. Window - Table 18 |
| Dining Speed | Leisurely | Waiters | 1. Chris Marks |
| Customer Since | 1991 | | 2. Ray James |
| Average Session | 2 hours 30 minutes | | 3. Becky Dwight |
| Key Engagement Message ||||
| Absolutely do not hurry Ron. ||||
| Memos ||||
| Date | Sales Rep | Memo ||
| 10/12/02 | Chris Marks | Ron likes to take his time over dessert and coffee ||
| 06/15/02 | Chris Marks | Likes the food spicy ||
| 02/15/02 | Becky Dwight | Ron is a red wine connosuier. He loves sampling our new South African Wines ||
| Food Preferences ||||
| Course | Entrée | Notes ||
| Appetizer | Papaya Salad | ||
| Main Course | Mongolian Beef | Likes it a little on the spicier side ||
| Dessert | Sorbets | Only non-dairy desserts for Ron ||
| Beverage Preferences ||||
| Beverage | Brand | Notes ||
| Wine | Johannesburg Merlot | Offer the half bottle when it is a party of two ||

FIG. 4

| Sample Retailers Engagement Plan (for Service Provider) |||| |
|---|---|---|---|
| Profile || Preferences ||
| Name | Beth Page | Departments | 1. Women's Apparel |
| Zip Code | 94312 | | 2. Home Furnishings |
| Status | Platinum | | 3. Kids |
| Shopping Speed | Fast | Sales Clerks | 1. Chris Marks |
| Customer Since | 1993 | | 2. Ray James |
| Average Session | 30 minutes | | 3. Becky Dwight |
| Key Engagement Message ||||
| Ensure that Beth finds everything she is looking for. Check with her half way through the session. ||||
| Memos ||||
| Date | Sales Rep | Memo ||
| 10/12/02 | Chris Marks | Looking for a unique valentine gift for her husband who enjoys sports ||
| 06/15/02 | Chris Marks | Will be vacationing in the Bahamas. Wants to shop for the trip ||
| 02/15/02 | Becky Dwight | Has recently remodeled her kitchen. Looking for new cutlery and crockery ||

FIG. 6A

| Sample Retailers Engagement Plan (for Customer) | | |
|---|---|---|
| Product Preferences | | |
| Product | Description | Basis for Recommendation |
| 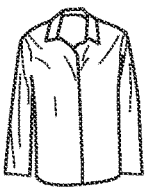 | French Cuff Shirt. Pure cotton. Single button cufflink at each wrist. Hits at hip. Imported. Machine wash.<br>Original Price: $58.00<br>On Sale: $38.00 | Viewed on website on 11/02/02 |
| 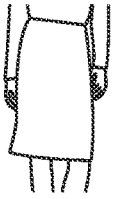 | The Essential Pencil Skirt. In refined wool with a touch of stretch for shape. 8.5" center back slit. Back zip closure. 26" long. Straight hem. Lined. Imported. Dry clean.<br>Price: $78.00 | Viewed on website on 11/02/02 |
| 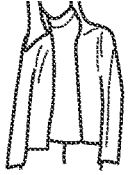 | Fitted and feminine in the, soft leather. Zip front. Side hip pockets. 4.75 inches long zippers at each sleeve. Hits at hip. Lined. Imported. Professional leather clean<br>Price: $198.00 | Cross-sell for Center Seam Boot. Purchased on 09/05/02 |
| Gift Preferences | | |
| Recipient | Lifestyle | Recommendations | |
| Friend | "For Her" |  | Long Silk Scarf. Take your style to new lengths with this luxurious pure silk scarf. Elegant and extra-long at 74" x 6", plus a delicate 11.5" fringe at both ends. Imported. Dry clean<br>Price: $48.00 |
| Husband | Sports Enthusiast | 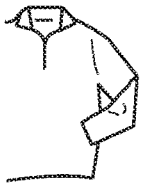 | Open Polo Sweater. Pure thick wool, mercerized for extra softness. Open polo collar. Raglan sleeves. Ribbed trim. Imported. Dry clean<br>Price: $78.00 |

Form Designer - SelectRFM

Select an RFM Measure

○ Number of Customer Visits
○ Average Transaction Size
○ Average Number of Days Since Last Visit

[Submit]

SelectRFM | Mod

Form Designer - SelectStoreSession

Select a Store Session Measure

○ Duration of Visit
○ Number of product trials per visit
○ Number of interactions with preferred sales reps per visit
○ Number of customer interaction memos created per visit
○ Number of customer interaction memos utilized per visit

[Submit]

SelectStoreSession | Mod

Form Designer - SelectAnalysis

Select a Type of Analysis
- ○ Impact Study
- ○ Correlation Study

[ Submit ]

SelectAnalysis | Mod

Form Designer - CorrelationStudy

Select one RFM Measure
- ○ Number of Customer Visits
- ○ Average Transaction Size
- ○ Average Number of Days Since Last Visit Select one Store Session Measure for the Correlation
- ○ Duration of Visit
- ○ Number of product trials per visit
- ○ Number of interactions with preferred sales reps per visit
- ○ Number of customer interaction memos created per visit
- ○ Number of customer interaction memos utilized per visit

[ Submit ]

CorrelationStudy | Mod

| ⃞ Form Designer - StoreLocations | _ ☐ ✕ |

Select Store Locations

Region — All Regions ▼
State — All States ▼
Metro — All Metros ▼
Store — All Stores ▼

[ Submit ]

StoreLocations | Mod |

| ⃞ Form Designer - DrawGraph | _ ☐ ✕ |

Duration — 6 months ▼ — 2602
Frequency — Daily ▼ — 2604

[ Draw Graph ]

DrawGraph | Mod |

☑ Form Designer - SelectMsgType     _ ☐ ✕

Select Objective of Engagement Message
○ Customer Retention (Goal: To maintain RFM Score)
○ Prevention of Customer Loss (Goal: To respond to drop in RFM Score)
○ Customer Incentive (Goal: To increase RFM Score)

[ Submit ]

SelectMsgType | Mod

☑ Form Designer - CustomerRetention     _ ☐ ✕

Select RFM Score

| Recency | Mid ▼ | —2802 |
| Frequency | High ▼ | —2804 |
| Monetary | Low ▼ | —2806 |

Type Message: [                    ] —2808

[ Submit ]
         \
          2810

CustomerRetention | Mod

| | Method | | | | Description |
|---|---|---|---|---|---|
| | Electromagnetic Coupling | Electromagnetic Induction | Microwave | Light | |
| Communication Frequency | 400 ~ 530KHz | 120 ~ 150KHz 13.56MHz | 2.45 GHz | Infrared radiation (670nm) | In a broad sense, electromagnetic coupling is included in electromagnetic induction. |
| Communication Distance (theoretical value) | △ ~150mm | ○ ~500mm | ● ~5mm | ○ ~300mm | R/W type R/O type excluded |
| Stabilized communication at manufacturing environment | ● | △ | ○ | ○ | Stability in noisy environments |
| Communication Speed (data communication rate) | ○ | △ | ● | ○ | Depends on fequency. |
| Communication Directivity | △ | × | ○ | ● | Depends on fequency. |
| Reflection/interference during Communication | ● | △ | × | ○ | Interference between antenna and DC, etc. |
| Electromagnetic Field Noise Immunity | ● | ● | ● | ● | Inverter, motor, power supply, etc. |
| Light Resistance | ● | ● | ● | △ | Sunbeam, fluorescent light, etc. |
| Water proof/oil proof (moisture influence) | ● | ● | △ | × | From theoretical and structural view |
| Chemical Resistance (coolant, cleaner, etc.) | ● | ● | △ | × | From theoretical and structural view |
| Stain proof/communication capability through glass and resin (plastic, etc.) | ● | ● | ○ | × | From theoretical and structural view, Deterioration of communication distance included. |
| Conformity to Japanese domestic radio wave regulation | ● | ○ | △ | ● | Requirements of application to open radio station, etc. |
| Conformity to radio wave regulations of outside Japan | ○ | ● | ○ | ● | USA, FCC, EC, ETSI, etc. Model acknowledgment by manufacturers. |

Excellent ● > ○ > △ > × Poor

FIG. 41

CUSTOMER RELATIONSHIP MANAGEMENT SYSTEM FOR PHYSICAL LOCATIONS

RELATED APPLICATIONS

This application is a divisional application of U.S. patent application Ser. No. 10/352,750 which is a continuation-in-part of U.S. patent application entitled Customer Relationship Management System for Physical Locations filed under Ser. No. 10/290,008 on Nov. 7, 2002, the contents of which are each incorporated by reference herein.

FIELD OF THE INVENTION

The present invention relates to customer relationship management, and more particularly, this invention relates to customer relationship management in a physical environment.

BACKGROUND OF THE INVENTION

Modern society has created a plethora of ways to provide goods and services to customers. However, physical locations continue to be the predominant forums preferred by customers. Whatever the type of business, be it retail stores, banks, restaurants, patio cafes, or any other type business, customers prefer to interact directly with the providers of the goods and services. Physical locations include what is referred to herein as Brick and Mortar (BM) establishments, i.e., those places a customer can physically go to purchase goods, receive services, etc.

The most prominent examples of Physical Locations where commerce is transacted are Brick and Mortar Retail Establishments. However, the scope of the invention not only applies to retail establishments, but can also be applied to other physical locations such as banks, restaurants, hospitals, sports arenas, amusement parks etc.

Retail is the second-largest industry in the United States both in number of establishments and number of employees. It is also one of the largest worldwide. The retail industry employs more than 22 million Americans and generates more than $3 trillion in retail sales annually.

Over 93% of all sales take place in retail stores, meaning that an opportunity exists to interface directly with the customer. However, the limitations of heretofore known Customer Relationship Management (CRM) tools is that when a customer walks in the door of a retail establishment there is no means of obtaining the customer profile. That is, in the window of time between the customer walking in the door until the customer is at the Point-Of-Sale (POS), a retail store does not know the customer profile and therefore cannot service the customer properly. This is unlike the web, where a returning customer is immediately identified upon entering the homepage.

Proper servicing is critical to customer retention. It is estimated that a five percentage point increase in customer retention in a typical company will increase profits by more than 25%, and growth by more than 100%. Customer loyalty also accelerates growth. The typical Fortune 500 company, for example, has real annual growth of 2½%. If it retains 5% more of its customers each year, real growth will triple to 7½%.

From a perspective of customer service at the Brick and Mortar level, the "As-Is" situation is that there is no mechanism to effectively service the customer based on his profile, preferences and transaction history, or at best these mechanisms are very ad-hoc and un-automated. The only service that currently exists in a BM establishment, is in the form of incentives given after a transaction in order to entice the customer to return. These incentives vary from loyalty cards (buy 9 get the 10th free), to gift certificates. However, these incentives have are very limited in their effectiveness, because they are offered at the end of the transaction—which is too late.

The following two data-points illustrate the severe limitations of the As-Is situation from a revenue and profitability perspective:

According to IBM Consulting, the top 5% of retail customers generally contribute 20% to 25% of sales revenues and 25% to 45% of profits. And according to Bain & Co., a 5% increase in customer retention can produce profit increases as high as 125% However, even though over 93% of retail sales happen in retail establishments, a retailer using any of the above-described systems cannot identify a top 5% customer when she walks in the door. Nor can a retailer service customers appropriately to increase retention. Nor can the retailer convert a new customer who has the potential to spend like a top 5% customer does, into a loyal customer.

What is needed is a system and method to address all three of the limitations discussed in the previous paragraph.

Further, in most situations, a retailer/service provider has few or no methods to solicit, capture and respond to customer feedback. It needs tools to effectively manage the business based on actual customer experiences. In addition, it lacks formalized pre-sales customer service. Customer service is disjointed, roles and responsibilities are not clearly defined, and standards for customer communications and corrective actions are lacking.

The present invention solves the aforementioned problems, and improves on prior art attempts to provide CRM, by providing a new design that assists the enterprise in the following, in the context of brick and mortar establishments:

Identifies a customer as soon as she walks in the door

Locates a customer within a Physical Store

Syncs up with the corporate CRM system to get a "holistic-view" of customer. This includes preferences based on past transactions, which occurred on all channels for interacting with customers. The channels include physical store, ecommerce web-sites, catalog sales, telesales Alerts service provider with customer's preferred status Provides service provider with possible cross-sells/up-sells for the customer Provides service provider with memos of prior engagements with the customer Creates an engagement plan for a customer Allows for data input after each interaction to improve the engagement plan for future transactions Disseminates the engagement plan to the service provider servicing the customer Uses a Cookie-based session concept to manage a customer session at a store in the same manner as a software cookie is used to start and manage an eCommerce session on the Web, thus providing valuable customer behavior data in order to create a holistic view of the customer Interfaces with POS system to determine if a new customer qualifies for new incentives Interfaces with POS to determine incentives and print incentives on receipt Captures the customer transaction in a physical location as part of the session Performs analytics on the session information in order to enable corporate to get detailed insights into the customer transactions Allows corporate to send key engagement messages to the service providers at the physical location

SUMMARY OF THE INVENTION

The present invention provides solutions for enhanced customer experience for businesses conducted in "brick and mortar" establishments. As mentioned above, the notion of "brick and mortar" establishments encompasses physical locations. The embodiments of the present invention disclosed herein allow personalized service to the customer from the moment of his/her arrival in the facility. It enables targeted marketing and sales promotions (up-sell/cross-sell) for individual customers, much prior to the POS touch-point (checkout lanes). Furthermore, for the first time, it extends the full powers of an e-CRM system to a traditional brick-and-mortar business. All of this consequently empowers businesses to provide enormously improved customer focus and presales, sales, and post-sales service thereby greatly increasing customer retention and loyalty.

According to one embodiment, a method for managing information about transactions occurring in a physical establishment includes gathering information about multiple transactions at a physical establishment, and storing the information as metadata. A byte stream corresponding to the metadata is generated. Several elements of the metadata are associated with a particular session based on predefined criteria.

In another embodiment, a method for managing information about transactions occurring in a physical establishment includes gathering information about a transaction at a physical establishment, the transaction relating to a person at the physical establishment. The information is matched to pre-specified event types and converted to a standardized form. The converted information is stored as metadata based on the matching. The metadata is then made available to a requesting program.

In a further embodiment, a method for measuring customer value includes identifying a customer utilizing a wireless system and collecting information about transactions relating to the customer using the wireless system, where the transactions occurring at a physical establishment. Information about additional transactions relating to the customer is also collected. These can be any type of transaction. A frequency score indicating a frequency of occurrence of a pre-specified type of the transactions is generated, as is a monetary score indicating an amount of money expended by the customer. Finally, the scores are output.

According to yet another embodiment, a method for measuring customer value includes collecting information about transactions relating to the customer using the wireless system, the transactions occurring at a physical establishment. Information about additional transactions relating to the customer is collected. A frequency score indicating a frequency of occurrence of a pre-specified type of the transactions is generated, as is a monetary score indicating an amount of money expended by the customer. At least one of the scores is based at least in part on a duration of a visit to the physical establishment by the customer.

In another embodiment, a method for managing messaging to a person includes selecting a message to present to a person based on at least one of the following: a frequency score indicating a frequency of occurrence of a pre-specified type of transaction, a monetary score indicating an amount of money expended by the person for a specified time frame, a change in the frequency score, a change in the monetary score, and an average duration of visits by the person.

According to still yet another embodiment, a method for reporting information about events occurring at a physical location includes gathering data about multiple events at a physical location, the events including transactions and interactions of a person at the physical location. The information about the events is stored as metadata. Metadata about at least one event that occur at the physical location is assembled. Information about at least some of the events that occur in the physical location are displayed.

In a further embodiment, a method for evaluating performance of a sales person based on events occurring at a physical location includes gathering data about multiple events at a physical location, the events including transactions and interactions of a sales person at the physical location. A rating of the sales person is generated based on the events.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 depicts an illustrative restaurant engagement plan.

FIGS. 6A-B depict illustrative retail engagement plans.

FIG. 13 shows a screen that allows a user to select a type of RFM measure to output.

FIG. 14 depicts a screen that allows the user to select one or more types of store session measures to output.

FIG. 17 illustrates a screen that allows selection of a type of analysis to perform on store data.

FIG. 18 shows a screen for selecting parameters for a correlation study.

FIG. 25 illustrates a screen that allows the user to define the store locations for which the impact study parameters are calculated.

FIG. 26 illustrates a screen that allows the user to select the duration and frequency of the store data to be output for the impact study.

FIG. 27 shows a screen that allows a user to select an objective of an engagement message.

FIG. 28 depicts a screen for creating a customer retention message.

FIG. 41 is a table listing characteristics of various types of RFID systems that can be used with embodiments of the present invention.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

CRM Hardware/Software System

Figure 1:
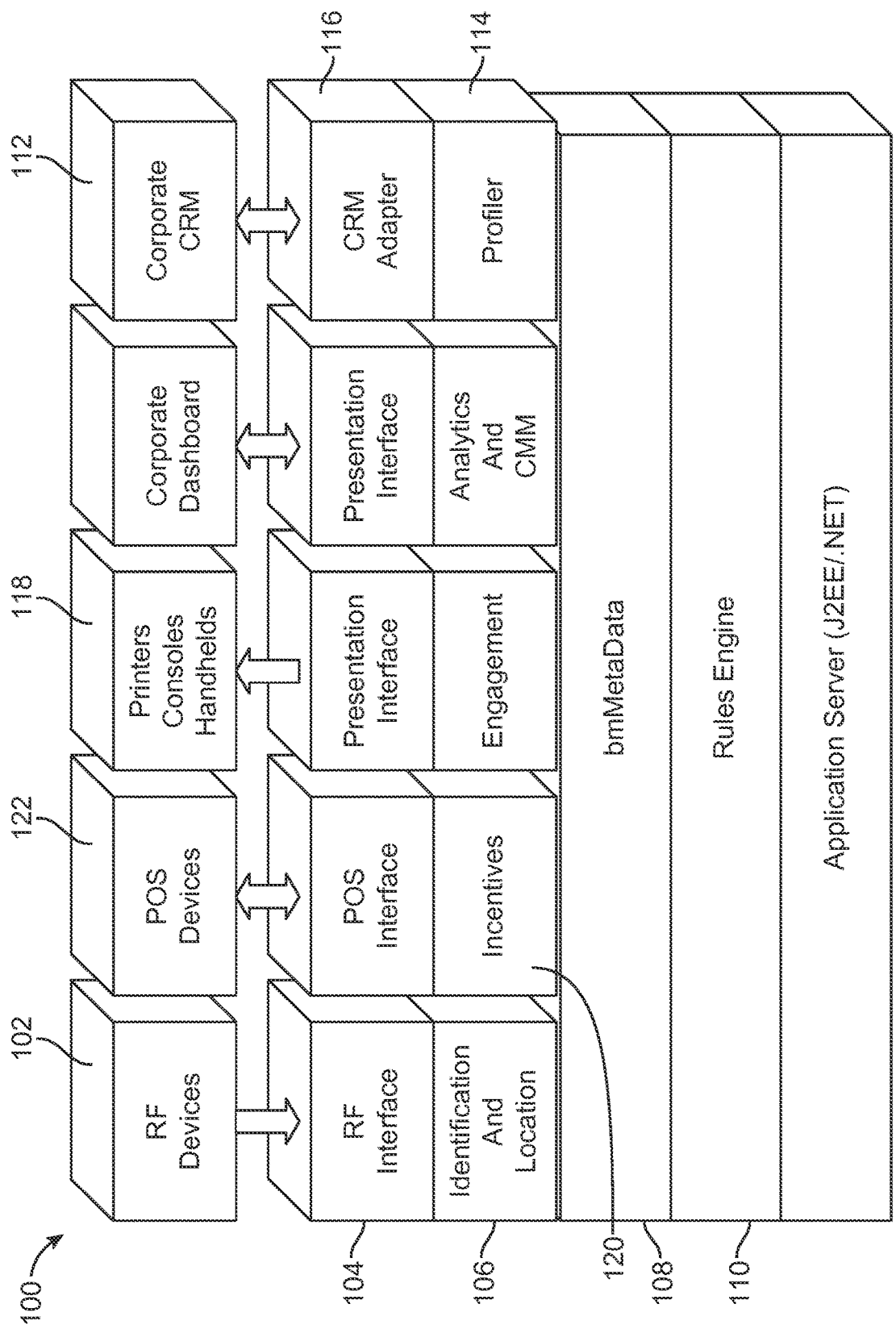
FIG. 1 is a system diagram of a wireless CRM system according to one embodiment of the present invention.

FIG. 1 depicts a wireless CRM system 100 according to one embodiment of the present invention. As shown, a radio frequency (RF) device or object 102 capable of being identified by the wireless system is carried by a person such as a customer, client, delivery person, or anyone interacting with the business. For simplicity, the following description will refer to a "customer," with "customer" meaning anyone interacting with the business or system.

The wireless technology that can be used in conjunction with this and other embodiments includes Radio Frequency Identification (RFID), smart cards, or any other type of wireless technology. The preferred wireless technology does not require line-of-site to the reader, so that an object in a wallet or purse can still be read without removing it. Thus, the device carried by the customer can be any device capable of being identified by a wireless system, such as a smart card, an RFID tag, etc. Note that contact-based systems can also be used, as noted below.

Smart cards are one preferred device because they are able to make maximum use of information available at the point of sale (customer purchasing history, number of points accrued, etc.) and allow instant rewards. Smart cards hold portable files, securely holding personal information about customer profiles, purchasing behavior and histories. Smart cards are suitable for operations with multiple partners, plus offer the possibility of adding or deleting partners, including after card issuance. Smart cards also facilitate home-shopping loyalty programs on the Internet, and are the bridge between the world of e-commerce and real-world points of sale in "brick and mortar" establishments.

RFID is discussed below in the section entitled "Overview of RFID." Other items include RFID-chipped objects such as key chains and mobile phone covers that are typically more exposed than a card in a wallet or purse and are thus more easily read. Preferably, the object is capable of being identified by the wireless system without requiring a line of sight to the object. This allows the system to identify the object even though it is stored in a pocket, wallet, purse, etc.

A wireless interface 104 is provided for communicating with the object. An identification module 106 identifies the RF Tag and correlates the device to the customer. A meta data model 108 is used in conjunction with a rules engine 110 as the basis for cataloguing customer behavior and also serves as the basis for communicating the details of a session to the corporate CRM software/system 112 via an adapter interface 114. Preferably, the system can integrate with any already-existing CRM system, allowing the company implementing the new system to retain its investment in the prior system.

A profiler 116 generates an engagement plan based on personal information of the customer. An output device 118 outputs the engagement plan and/or identification information about the customer for assisting a user to identify the customer. For example, the identification information may include a visual likeness of the customer.

An incentive module 120 in combination with a point of sale (POS) device 122 outputs incentives (coupons, rebates, etc.) with the customer's amount due for services, products, etc. The incentive module also communicates with the output device 118.

Additional wireless interfaces can be provided to allow tracking of physical movement of the customer via, for example, triangulation. During tracking, the output device can output a physical location of the customer. Further, product information can be selected based at least in part on the personal information of the customer. The product information is output near the customer, i.e., within the customer's range of sight and/or hearing. The output can be visual, auditory, physical (paper coupon), etc.

The system preferably provides the following functionality:
  CRM analytics
  Customer relationship optimization (CRO)
  Marketing
  Marketing resource management (MRM)
  Ad management services The CRM system enables customer identification based on customer profile at the store level when the customer walks in to a Brick and Mortar establishment. The following are a list of preferred features of the system:
  Identifies a customer as soon as she walks in the door
  Locates a customer within a Physical Store
  Syncs up with the corporate CRM system to get a "holistic-view" of customer. This includes preferences based on past transactions, which occurred on all channels for interacting with customers. The channels include physical store, ecommerce web-sites, catalog sales, telesales
  Alerts service provider with customer's preferred status and preferences
  Provides service provider with possible cross-sells/up-sells for the customer
  Provides service provider with memos of prior engagements with the customer
  Creates an engagement plan for a customer
  Allows for data input after each interaction to improve the engagement plan for future transactions
  Disseminates the engagement plan to the service provider servicing the customer
  Uses a Cookie-based session concept to manage a customer session at a store in the same manner as a software cookie is used to start and manage an eCommerce session on the Web, thus providing valuable customer behavior data in order to create a holistic view of the customer
  Interfaces with POS system to determine if a new customer qualifies for new incentives
  Interfaces with POS to determine incentives and print incentives on receipt
  Captures the customer transaction in a physical location as part of the session
  Performs analytics on the session information in order to enable corporate to get detailed insights into the customer transactions
  Allows corporate to send key engagement messages to the service providers at the physical location The present invention preferably assists the enterprise to:
  Identify their customers
  Interact with customers who may be resistant to providing information on themselves
  Invest more in the systems used at the point of customer contact
  Become smarter in using the information already at hand
  Make doing business simpler, including products and offers
  Understand the real economics of each customer
  Develop a realistic set of business needs (i.e., vs. the wants and desires)
  Listen to customers more, and ensure that they feel reassured at each step, and that their data is protected
  Define processes for gathering feedback from its customers and processes for servicing its customers
  Provide collaboration from throughout the organization
  Use a database of information about its customers and mining that data to improve customer relationships and increase revenue
  Improve the customer experience by acting on feedback received from its customer surveys and offering customer loyalty programs
  Use metrics to measure its success, enabling it to show measurable results from its CRM efforts
  Provide instant rewards at the point of sale
  Maintain multi-step campaigns to increase the effectiveness of campaigns by specifying follow-up interactions with each customer, including utilizing alternative channels such as direct mail or call center
  Deliver consistent communications across all marketing channels-in-store, call center, and online
  Profitable Interaction Centers: Siebel Marketing, when combined with Siebel Call Center, improves the effectiveness of both outbound telemarketing campaigns and inbound call handling, and helps transform customer interaction centers into profitable revenue sources that execute coordinated multichannel marketing programs. Agents are able to execute real time marketing campaigns and deliver targeted offers that reflect knowledge of all marketing campaigns across all channels, quickly resulting in higher sales and greater customer satisfaction In a variation of the system described with respect to FIG. 1, a reader that requires physical contact with the identifying object can be used. For example, a card reader can be positioned at the entry to a store. Upon entering, the customer would swipe the card through the reader, which in turn would read a magnetic stripe on the card and thereby identify the customer.

Figure 2:
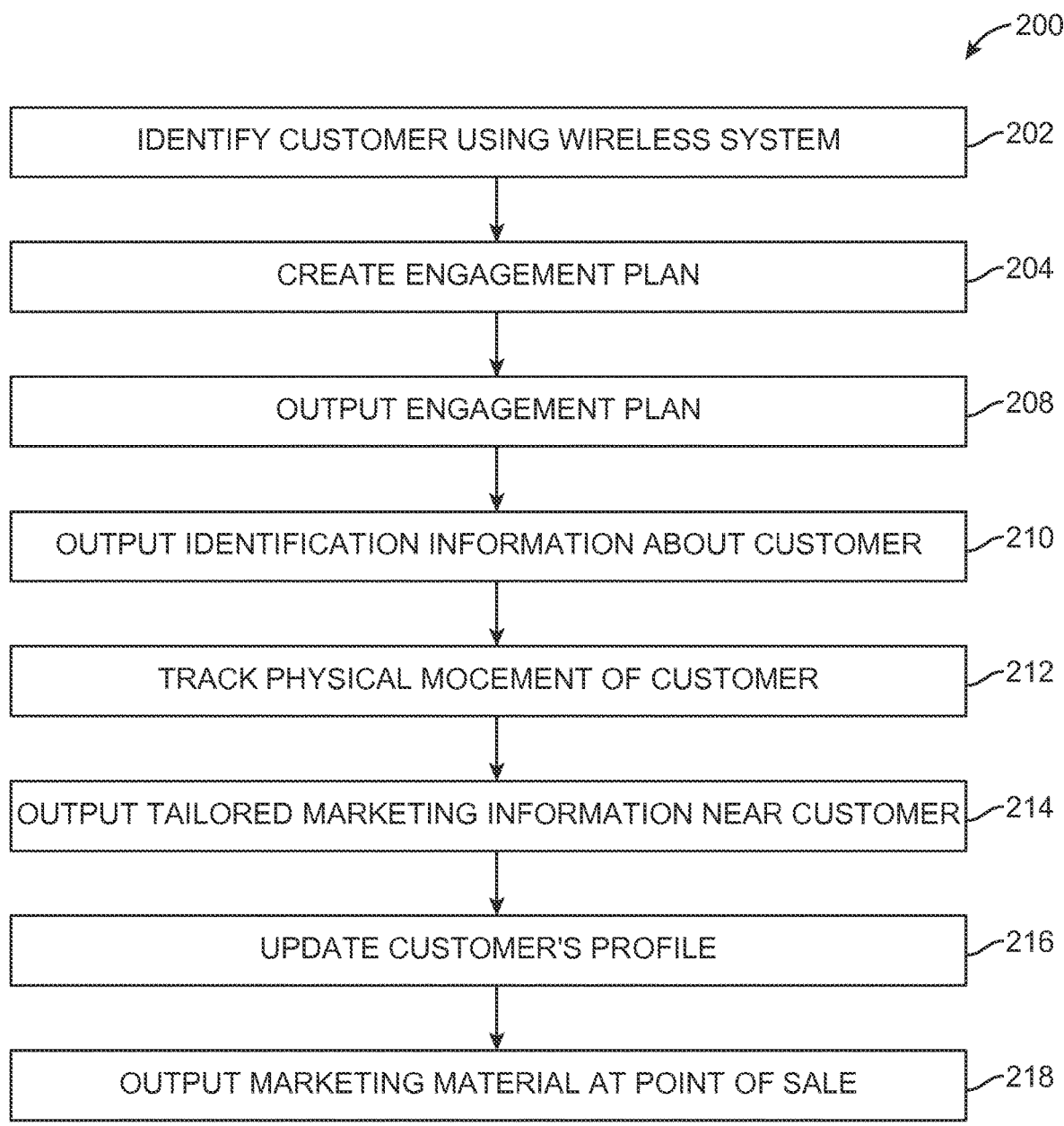
FIG. 2 is a flow diagram of a process for outputting information about a customer.

FIG. 2 illustrates a process 200 for outputting information about a customer using a wireless system such as the system shown in FIG. 1. In operation 202, the customer is identified utilizing a wireless system. Preferably, the customer is identified at an entrance to a defined area such as the interior of a structure, where the engagement plan is output within a predetermined amount of time from the identification of the customer to allow, for example, a sales associate or service provider to exploit the window of time from when the customer enters a store until the customer checks out. Additionally, the customer can be identified at a predetermined location, such as in a particular department.

In operation 204, an engagement plan is created based on the profile (of the customer) associated with the identification of the customer. The engagement plan has information useful for interacting with the customer. Such information can be aimed at a service provider or retailer and can include suggestions, strategies, explicit instructions, etc. The engagement plan can also include other types of useful information, including a preference of the customer such as favorite salesperson or waiter, favorite food item or type of product, preferred seat, etc. The engagement plan may also include a preferred engagement level, i.e., brief to extended. Information for cross-selling can also be included. Additionally, incentives such as coupons, rebates, loyalty rewards, etc. can accompany/be included in the engagement plan.

The engagement plan also entails marketing and promotions output directly to the user. More discussion regarding this feature is provided below.

The engagement plan is preferably created based at least in part on personal information of the customer. Personal information refers to any type of information associated with that customer alone, such as a profile, name, transaction history, preferences, account number, user identification number, etc. The engagement plan may also be tailored based at least partially on input relating to a prior interactions of the customer with one or more of a website, a physical location such as a store, a catalog transaction (catalog sale or request for information), and a telesales interaction. An interaction occurs, for example, when the customer in some manner views, discusses, searches for, and/or requests an item or service in one of the contexts set forth above.

Additionally, the driving software can be implemented with other applications, such as debit/credit card, e-purse, private payment, e-couponing and more, bringing additional benefits and convenience for customers.

To effectively engage those customers who look online or in magazines prior to purchasing a product or service, the engagement plan may also include a description of the item or service that the customer looked at or discussed online, in a store, on the phone with a catalog or teleservice representative, etc. For example, the user would be identified during a browsing session using a cookie and the items viewed during that session would be logged for later integration into an engagement plan.

Preferably, a status of the customer is determined on a tiered scale. This identifies the customer on a tier such as an occasional customer, a general customer, a preferred customer, a top 5% customer, etc., and the customer's position on the tier can be based on prior transaction/purchase history, past sales, etc. The engagement plan may then be created based at least in part on the status of the customer.

For example, the status of a customer can be specified on a tiered scale: Platinum, Gold, Silver, Bronze etc. This may be determined both on the revenues generated by virtue of purchases made by the customer, and also by costs incurred in servicing the customer. There could be various types of costs incurred in servicing a customer. Some examples are: post-sales customer service over the telephone, post-sales customer service over email, post-sales customer self-service by using the web-site, costs associated with products returned by the customer. The industry figures for post-sales customer-service are: Telephone—$12 per call; Email—$4 per email which is responded to; Web-based self-service—4 cents The engagement plan is output in operation 208. In operation 210, identification information about the customer is output to assist a user in identifying the customer. Exemplary identification information includes a visual likeness of the customer. Other identification information may include a probable location of the customer. This information can be determined, for example, based on statistics of departments and/or sales items in which the customer has shown interest in the past. Additionally, past transaction data can be mined in order to determine the most likely location of the customer.

In operation 212, physical movement, i.e., geographical or positional movement, of the customer is tracked utilizing the wireless system. This data reflects which items the customer looked at most, which department she spent the most time in, etc. This in turn helps optimize product placement and promotion.

Tracking data can also be used to help a user find the customer, such as by outputting an indicator of a physical location of the customer. The personal information of the customer can be updated based on the physical movement of the customer.

For tailored marketing, product information and/or pricing can be selected based at least in part on the personal information of the customer and/or the physical location of the customer, and output near the customer, i.e., within the customer's range of sight and/or hearing. Note operation 214. The output can be visual, auditory, physical (paper coupon), etc. Similarly, special product or service pricing can be selected based at least in part on the personal information of the customer, and output near the customer. Illustrative output devices for such tailored marketing include networked screens, portable devices, speaker systems, kiosks, etc.

Kiosks can also identify a customer and provide tailored output to particular customers, allowing them to shop an expanded product assortment, use registries, and get in-depth product information for in-store research.

To tailor a sales pitch to an undecided customer, or offer assistance or a promotion for a product the customer has shown interest in, a correlation can be made between the customer and products transported by the customer using the wireless system. This can be accomplished using positional sensing of RFID tags on products being in about the same position as the customer, sensing movement of a product while the customer is nearby, etc.

While the invention provides significant value in identifying and servicing a customer, there are scenarios when the value is further enhanced. One such scenario is when every item is tagged with a RFID Tag. In this scenario the Brick and Mortar Session could capture events such as products viewed by a customer and products tried by the customer. The Products Viewed Event would be based on the proximity of the person to a product; The Product Tried/Evaluated would be based, for example, on the product being transported by a customer to a changing room in a Retail Store. The executive dashboard could then show valuable metrics such as which products are being tried but not being purchased. This could indicate that the price is too high.

Whether the correlation takes place can be determined based on the physical position of the customer and product, such as in a changing room. The correlation can also be made upon the user physically moving the product a predefined distance, such as more than three feet from its original position, etc.

The wireless system may also correlate the customer with products potentially viewed by the customer for future reference into the interests of the customer. For example, products near stopping points of the customer as he passes through a store may be considered of general interest to the customer. These products can be identified and logged, and listed on a later engagement plan as a potential sell.

As an option, an alert can be activated upon expiration of a predetermined amount of time to instruct a user to check a service level of the customer to ensure that the customer is being serviced properly.

In operation 216, the customer's personal profile is updated based on information received during the session. For example, feedback can be obtained directly from the customer and stored for use in creating a future engagement plan. Information can also be received directly from a user that has interacted with the customer, and stored for use in creating a future engagement plan.

Towards the end of the session, an incentive (coupon, rebate, etc.) can be output to the customer at the POS with an amount due by the customer for services, products, etc. See operation 218. The system may also be integrated with a self-checkout system.

Figure 3:
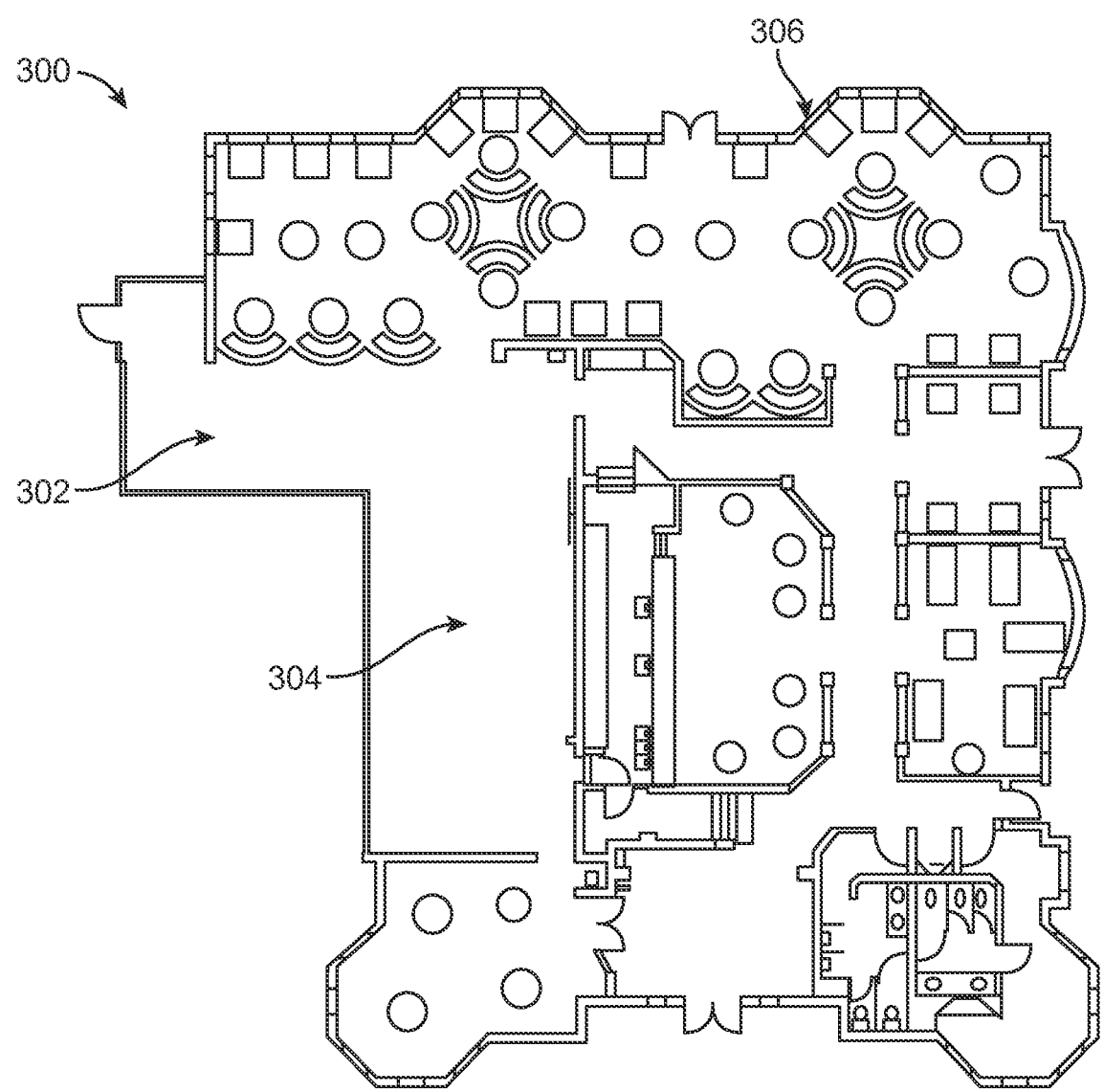
FIG. 3 depicts an illustrative restaurant setting for deployment of a CRM system.

FIG. 3 depicts an illustrative restaurant setting 300. At the entrance 302, an RF floor antenna senses the entrance of a preferred customer. This triggers a StartSession event. At 304, the manager is notified of the customer's preferred status and seating preference. This data is stored locally. The customer is seated per his or her preferred seating profile: window and corner (306).

The manager receives an engagement plan from the central CRM system. The plan includes:
 current incentives and redemption
 waiters who have served the customer previously
 wine and main course preferences
 special dietary requirements The manager briefs the selected waiter with the engagement plan. The waiter in turn appraises the customer of incentives, preferably prior to taking the customer's order. After a predetermined amount of time (generated based on prior history) has elapsed since the start of the session, the manager is alerted to check if the preferred customer is being serviced properly.

Towards the end of the session, the CRM interfaces with the POS to determine if the customer qualifies for new incentives and, if so, prints them on the check. The waiter in turn notifies the customer of the incentives. As the customer leaves, the manager wishes the customer goodbye and obtains overall feedback on the food and service, which the manager enters into the CRM system. The manager may also award a Preferred Customer card if the CRM determines that the customer qualifies for Preferred Status based on POS data.

When an RF floor antenna senses the customer leaving, an EndSession event is triggered. The manager and serving waiter provide updates for the next engagement plan. The session information and updates are sent to the central CRM.

FIG. 4 depicts an illustrative restaurant engagement plan 400. As shown, a customer information section 402 is provided, including name, tiered status, a preferred level of service, and the speed at which the customer typically dines. A memoranda section 404 contains a list of notes input by waiters/managers who have interfaced with the customer. A food preferences section 406 lists items the customer has previously ordered, and how he likes them cooked and any special dietary concerns. A beverage preferences section 408 lists the customer's preferred beverages.

Figure 5:
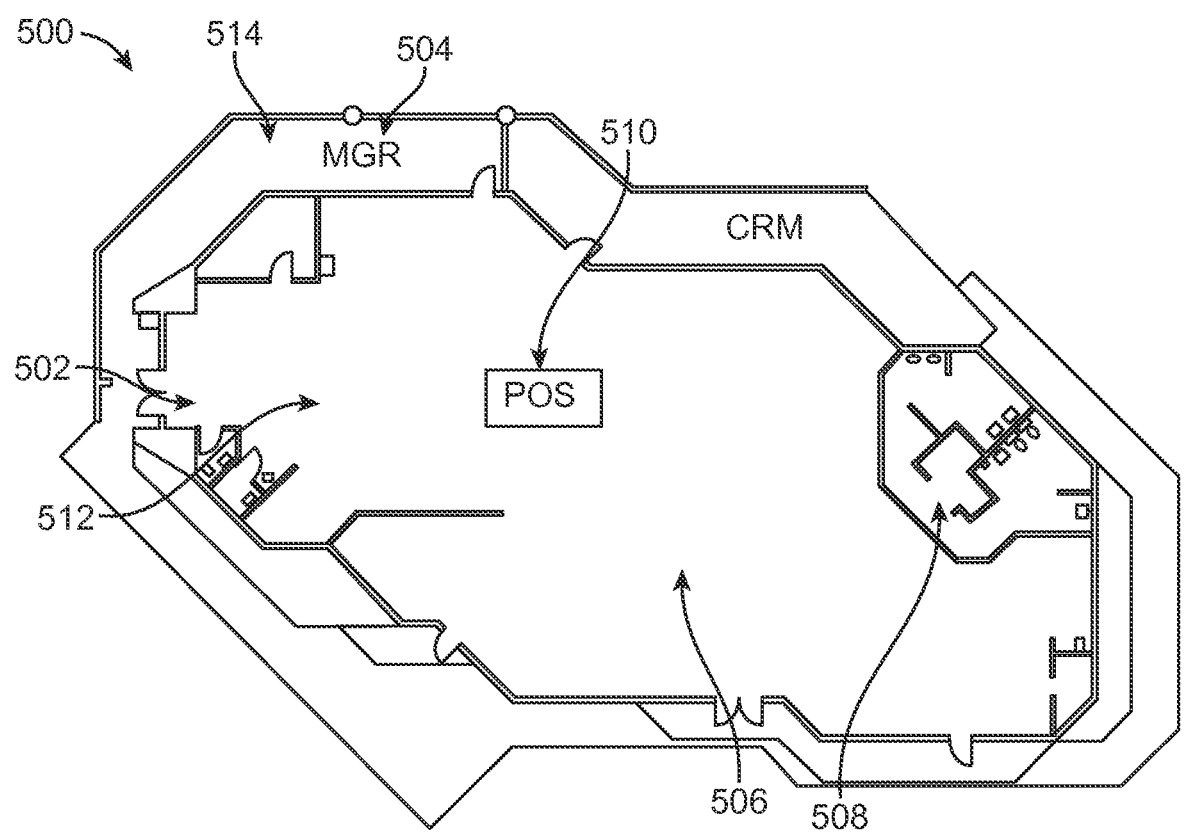
FIG. 5 depicts an illustrative retail setting for deployment of a CRM system.

FIG. 5 depicts an illustrative retail setting 500. One embodiment of the present invention for retail deployment provides the following features:
 Enables customer identification at the store level when the customer walks into the store
 Synchronizes information with the corporate CRM system to get "holistic-view" of the customer
 Alerts store manager with customer's loyalty rating
 Alerts store manager with possible cross-sells/up-sells for the customer
 Disseminates this information to the sales clerk servicing the customer
 Uses a cookie to manage a customer session at a store in a similar manner as a software cookie is used to start and manage an eCommerce session on the Web The system for retail deployment can be based on RFID Technology and a Real-Time Event-Driven Platform. RFID tags are put on a credit card carried by the customer.

RFID Readers are installed at the Store Entrance. This may require no additional investment if readers are already installed for theft prevention. These Readers enable the system to identify and initiate a start and end of a customer in-store session.

As an option, RFID Tags can also be installed on garments at the time of sale. When the POS-Clerk removes the anti-theft RF Transponder, a small RF Tag is installed on the garment (Note: RF Tags can be manufactured such that they are not affected by laundry; Sokymat has already demonstrated this for RF laundry applications). The RF tag is associated with a cookie that stores an association of the RF tag on a garment with the customer. When the customer re-enters the store wearing the garment, the cookie is used to indicate to personnel that the customer is wearing a garment purchased from that company.

With reference to FIG. 5, at the entrance 502, RF floor antenna senses entry of a preferred customer. Software at the store level reads the tag and generates a StartSession event. Session information can be stored at the store level and/or at the corporate level. Preferably, most of the session information is generated and stored at the local/store level to ensure fast operation. Where information is generated and stored may be altered depending on specific environments, performance considerations and implementation details.

The StartSession event starts a new customer in-store session. Software at the corporate level reads the event and interfaces with the back-end CRM system to obtain a customer profile.

At 504, the manager is notified of the presence of the preferred customer and an engagement plan is output from a central CRM system. The engagement plan can include:
 customer's loyalty rating
 sales representatives who have serviced the customer before
 memos from prior sales representatives
 list of cross-sells
 most likely departments to locate customer
 desired engagement level: brief to extended
 multi-channel aspects, such as prior interaction with a website, telesales, catalog transaction, etc.

The manager pages sales representatives who have been trained to handle preferred customers and briefs them with the engagement plan. The sales representative internalizes the engagement plan and prints the cross-sells list.

The sales representative tracks the customer to 506 based on departments in the engagement plan and engages with the customer per the plan. The sales representative may also hand over the cross-sells print out and highlight any cross-sells which may be on sale. The sales representative also gets feedback on the usefulness of cross-sells for this particular customer, which is then entered into the CRM system.

RFID Readers are also preferably placed at strategic locations in the store, such as the entrance to the changing room 508. When the customer walks past a strategic location, such as the changing room, instructions based on the customer profile are displayed on the sales-clerk's monitor at that location. An audio message can also be sent to the sales clerk. This is where the sales clerk can co-relate a customer's information with the customer and interface with the customer based on the customer's profile. These readers enable the intermediate transactions of a customer in-store session. RF antennas at the changing rooms provide events to the CRM system which enable tracking of frequency and duration of trips to the changing room.

RFID Readers are also preferably installed where the customers queue up—they are installed at the head of the queue, just before the POS. This Reader performs the last transaction of a customer in-store session. Here the POS-clerk can give a customer a cross-sell print, if the customer has not yet received it before.

When the customer proceeds to the POS at 510, the CRM interfaces with the POS to determine if the customer qualifies for new incentives, and prints it on the customer's bill. The POS reader instructs the POS clerk to give cross-sell print-out to customer. This instruction is given based on a set of rules encoded in the software. The cross-sell print-out not only contains the SKU's of the cross-sells, but could also have the size information. The POS clerk also notifies the customer of any new incentives. The customer may continue the session by asking a sales clerk to assist the customer in getting one or more of the cross-sells, promotional items, etc.

At the exit (512), the RF floor antenna senses the customer leaving, which in turn triggers an EndSession event. At 514, a sales clerk provides updates for the engagement plan. The session information and updates can be sent to a central CRM. Where final session information is stored may be altered depending on specific environments, performance considerations and implementation details.

Illustrative session information can include data for several analytics. Some examples are:

Average time a customer spends at a store
Average time a customer spends at a store based on different customer loyalties
Time of the day when the largest number of loyal customers visit a store
Which stores see the largest number of loyal customers If the customer does not have a card with an RFID tag or does not have preferred status, the CRM receives the POS data and determines if the customer qualifies for the tag and/or preferred status.

In another embodiment, a tag is attached to an item. For example, when a customer purchases a merchandise item, the POS-clerk installs an RF Tag, on the garment. This cookie has a unique ID, which can be associated with a cookie. When the customer wearing a tagged garment walks in, the system works in a similar way as it did with a customer with a tagged card.

FIG. 6A depicts an illustrative engagement plan 600 for a service provider. As shown, a customer information section 602 is provided, including name, tiered status, a preferred level of service, and the speed at which the customer typically shops. A memoranda section 604 contains a list of notes input by users who have interfaced with the customer.

FIG. 6B depicts an illustrative engagement plan 610 for a customer. A product preferences section 612 lists suggested products, including product details such as size, color, department, and whether the item is a past purchase or a suggested cross-sell. A gifts section 614 lists recommended gifts.

Metadata Model

According to one embodiment, a MetaData model is used to provide a comprehensive and standardized meta-data dictionary which captures all transactions, may they be commerce transactions or customer interactions, which occur in a brick and mortar establishment. As of today, no such comprehensive data dictionary exists.

As mentioned above in the discussion of FIG. 1, the MetaData model 108 can be implemented as a component of the CRM platform 100. All features can be implemented using web technologies and preferably run on any Java/.Net Application Server/Servlet Engine Platform.

Some of the benefits of the MetaData model are:

It allows the corporate departments of companies to get a detailed view of their store operations, especially from the perspective of commerce transactions, and sales-rep customer interactions.

It allows corporate departments to send consistent engagement messages based on customer profile and in-store customer transactions.

It allows for easy integration of various components of the CRM system described herein with each other, and with software from outside vendors. Typical examples of such third party software may include corporate CRM systems, corporate transaction systems which capture POS transactions, and corporate product catalogues.

The data dictionary can be based on an open architecture thereby enabling all industries to join and submit specifications and suggestions.

The open architecture and common elements enable interoperability between industries and between companies within an industry.

According to one embodiment, a method for managing information about transactions occurring in a physical establishment includes gathering information about multiple transactions at a physical establishment, and storing the information as metadata. A byte stream corresponding to the metadata is generated. Several elements of the metadata are associated with a particular session based on predefined criteria.

In another embodiment, a method for managing information about transactions occurring in a physical establishment includes gathering information about a transaction at a physical establishment, the transaction relating to a person at the physical establishment. The information is matched to pre-specified event types and converted to a standardized form. The converted information is stored as metadata based on the matching. The metadata is then made available to a requesting program.

Some of the key business benefits attained by implementing the MetaData model are increased customer loyalty, increased transaction size, fewer lost customers, and increased sales. Each of these benefits is discussed below.

Increased Customer Loyalty

Retailers understand the concept of repeat business and want to do what they can to get it. Retailers have to get to know their customers and listen to their concerns in order to establish the trust necessary for a strong, loyal, long-lived relationship. The problem is that the knowledge gained during one customer visit is not passed on to the next visit. MetaData captures this knowledge and makes it available in a succinct manner when a customer walks in again.

Increased Transaction Size

As part of the Engagement Plan, MetaData notifies the sales staff of the expected duration of a customer visit. It also provides information about which sales clerks the customer has interacted in the past, and which interactions have been the most effective. Armed with this information, a sales clerk can engage a customer at an appropriate time, and ensure that the customer finds everything she is looking for thereby increasing the dollar value of each transaction.

Prevents Loss of Valuable Customers

The first sign of a Retailer losing a valuable customer occurs when the Recency (R) value of her RFM scorecard starts falling. MetaData immediately notifies the manager when such an event occurs. It also makes the most recent transactions available to the store manager. The CRM system, which executes the rules specified by corporate, would advise the store manager of possible ways to engage and incent the customer to prevent loss of patronage.

Increased Comp Sales (Comparable Store Sales—Year Over Year)

Arguably the most important yardstick, which measures the success of a retail store, is its Comparable Sales, year over year. The MetaData model a retailer to significantly increase this measure. All of the above benefits: increased loyalty, reduced loss of valuable customers, increased transaction size result in significant increases in Comparable Store Sales.

MetaData XML Schemas

XML schemas may be used to describe the MetaData model. Following are four illustrative XML schemas. These are listed below, followed by an illustrative XML implementation example.

1. Brick and Mortar Event: This XML schema captures a Brick and Mortar Session Event. Several such events are part of a session.
2. Brick and Mortar Session: All the events in a customers visit to a Brick and Mortar Store reference one session. Essentially, one session captures all the transaction for a customer visit to a physical retail establishment.
3. Customer-Sales Rep Interaction: Captures the details of a single customer interaction with a sales rep. It also shows how the knowledge gained from a past interaction has been utilized.
4. POS Transaction: Captures a purchase transaction at a POS or a return transaction.

While these schemas relate primarily to the retail industry, schemas for other industries such as hospitality, banking etc. can be added. In the following examples, assume the schema target namespace is "www.novitaz.com/retail."

XML Schema for a Brick and Mortar Event

```
<?xml version="1.0" encoding="UTF-8"?>
<xs:schema targetNamespace="www.novitaz.com/retail"
xmlns:xs="http://www.w3.org/2001/XMLSchema"
xmlns="www.novitaz.com/retail" elementFormDefault="qualified"
attributeFormDefault="unqualified">
    <xs:element name="BM_EVENT">
        <xs:annotation>
            <xs:documentation>Captures a Brick and Mortar Session
Event. Serveral such events are part of a session</xs:documentation>
        </xs:annotation>
        <xs:complexType>
            <xs:sequence>
                <xs:element name="BM_EVENTID">
                    <xs:complexType>
                        <xs:simpleContent>
                            <xs:extension base="xs:integer"/>
                        </xs:simpleContent>
                    </xs:complexType>
                </xs:element>
                <xs:element name="BM_SESSIONID">
                    <xs:complexType>
                        <xs:simpleContent>
                            <xs:extension base="xs:integer"/>
                        </xs:simpleContent>
                    </xs:complexType>
                </xs:element>
                <xs:element name="BM_EVENT_TYPE">
                    <xs:simpleType>
                        <xs:restriction base="xs:string">
                            <xs:enumeration value="Start Session"/>
                            <xs:enumeration value="End Session"/>
                            <xs:enumeration value="Enter Department"/>
                            <xs:enumeration value="Exit Department"/>
                            <xs:enumeration value="Start Product Trial"/>
                            <xs:enumeration value="End Product Trial"/>
                            <xs:enumeration value="POS"/>
                            <xs:enumeration value="Customer Engagement"/>
                        </xs:restriction>
                    </xs:simpleType>
                </xs:element>
                <xs:element name="TIME">
                    <xs:complexType>
                        <xs:simpleContent>
                            <xs:extension base="xs:dateTime"/>
                        </xs:simpleContent>
                    </xs:complexType>
                </xs:element>
                <xs:element name="BM_EVENT_DETAIL">
                    <xs:complexType>
                        <xs:sequence>
                            <xs:element nam="DEPARTMENTID"/>
                            <xs:element name="SALESCLERKID"/>
                        </xs:sequence>
                    </xs:complexType>
                </xs:element>
            </xs:sequence>
        </xs:complexType>
    </xs:element>
</xs:schema>
```

XML Schema for a Brick and Mortar Session

```
<?xml version="1.0" encoding="UTF-8"?>
<xs:schema targetNamespace="www.novitaz.com/retail"
xmlns:xs="http://www.w3.org/2001/XMLSchema"
xmlns="www.novitaz.com/retail" elementFormDefault="qualified"
attributeFormDefault="unqualified">
    <xs:element name="BM_SESSION">
        <xs:annotation>
            <xs:documentation>All the events in a customers visit
to Brick and Mortar Store reference one session id</xs:documentation>
        </xs:annotation>
        <xs:complexType>
            <xs:sequence>
                <xs:element name="BM_SESSIONID">
                    <xs:complexType>
                        <xs:simpleContent>
                            <xs:extension base="xs:integer"/>
                        </xs:simpleContent>
                    </xs:complexType>
                </xs:element>
                <xs:element name="STOREID">
                    <xs:simpleType>
                        <xs:restriction base="xs:string">
                            <xs:enumeration value="Start Session"/>
                            <xs:enumeration value="End Session"/>
                            <xs:enumeration value="Enter Department"/>
                            <xs:enumeration value="Exit Department"/>
                            <xs:enumeration value="Start Product Trial"/>
                            <xs:enumeration value="End Product Trial"/>
                            <xs:enumeration value="POS"/>
                            <xs:enumeration value="Customer Engagement"/>
                        </xs:restriction>
                    </xs:simpleType>
```

```
      </xs:element>
      <xs:element name="DURATION" type="xs:double"/>
      <xs:element name="CUSTOMERID"/>
    </xs:sequence>
  </xs:complexType>
</xs:element>
</xs:schema>
```

XML Schema for a Customer-Sales Rep Interaction

```
<?xml version="1.0" encoding="UTF-8"?>
<xs:schema. targetNamespace="www.novitaz.com/retail"
xmlns:xs="http://www.w3.org/2001/XMLSchema"
xmlns="www.novitaz.com/retail" elementFormDefault="qualified"
attributeFormDefault="unqualified">
  <xs:element name="CUSTOMER_INTERACTION_MEMO">
    <xs:annotation>
      <xs:documentation>Captures the details of a single
customer interaction with a sales rep</xs:documentation>
    </xs:annotation>
    <xs:complexType>
      <xs:sequence>
        <xs:element name="MEMOID">
          <xs:complexType>
            <xs:simpleContent>
              <xs:extension
base="xs:integer"/>
            </xs:simpleContent>
          </xs:complexType>
        </xs:element>
        <xs:element name="STOREID" type="xs:int"/>
        <xs:element name="CREATEDON"
type="xs:dateTime"/>
        <xs:element name="CUSTOMERID" type="xs:int"/>
        <xs:element name="SALESREPID" type="xs:int"/>
        <xs:element name="UTILIZATION">
          <xs:complexType>
            <xs:sequence>
              <xs:element>
name="SALESREPID"/>
              <xs:element
name="UTILIZEDON"/>
              <xs:element name="RATING">
                <xs:simpleType>
                  <xs:restriction
base="xs:string">
    <xs:enumeration value="Very Useful - Resulted in Sale"/>
    <xs:enumeration value="Useful - Resulted in improved service"/>
    <xs:enumeration value="Not Useful"/>
                  </xs:restriction>
                </xs:simpleType>
              </xs:element>
            </xs:sequence>
          </xs:complexType>
        </xs:element>
      </xs:sequence>
    </xs:complexType>
  </xs:element>
</xs:schema>
```

Corporate Dashboard

The CRM system according to one embodiment includes a View module. The View module enables the corporate section of a company, which deals with the operations of its physical establishments (retail stores, restaurants etc.), to gain detailed knowledge of customer transactions, and interactions between sales reps and customer, which occur at the physical establishments. Further, it allows corporate to disseminate engagement plans and keys messages for different customer profiles. Because of this, all sales reps interacting with a particular customer communicate a consistent and coherent message.

One of the most important measures to gauge and increase customer value is a Recency-Frequency-Monetary (RFM) scorecard. All transactions of a customer are considered in creating an RFM scorecard. Recency (R) is a measure of how recent a customer's last purchase was. Frequency (F) is a measure of how frequently a customer makes purchases over a given period of time. Monetary (M) is a measure of the average dollar amount of transactions.

RFM measures provide vital information about a customer for successful engagement. For example, a customer who makes large purchases but visits the store infrequently may be as valuable as a customer who makes small purchases but visits the store very frequently. The first customer may need a significant amount of interaction time whereas the latter may need specific help on a previously researched item-any more time spent might be slowing down the shopper.

The View module, presents RFM-related measures as part of the corporate dashboard. In addition, it provides a whole set of measures which pertain to customer interactions within a physical establishment. These are enumerated below under the heading: "Store-Session Related Measures".

A method for measuring customer value using RFM includes identifying a customer utilizing a wireless system and collecting information about transactions relating to the customer using the wireless system, where the transactions occurring at a physical establishment. Information about additional transactions relating to the customer is also collected. These can be any type of transaction. A frequency score indicating a frequency of occurrence of a pre-specified type of the transactions is generated, as is a monetary score indicating an amount of money expended by the customer. Finally, the scores are output.

According to another embodiment, a method for measuring customer value using RFM scores includes collecting information about transactions relating to the customer using the wireless system, the transactions occurring at a physical establishment. Information about additional transactions relating to the customer is collected. A frequency score indicating a frequency of occurrence of a pre-specified type of the transactions is generated, as is a monetary score indicating an amount of money expended by the customer. At least one of the scores is based at least in part on a duration of a visit to the physical establishment by the customer.

RFM (Recency-Frequency-Monetary) Related Measures
  Number of preferred customers visiting store
  Average elapsed time since last store visit
  Average spending of preferred customer/per visit
Store-Session Related Measures
  Duration of visits by preferred customer
  Number of product trials per visit (In a retail store this
    may be the number of visits to the changing room)
  Number of interactions with preferred sales reps per visit
  Number of customer interaction memos created per visit
  Number of customer interaction memos utilized per visit
Correlation and Impact Studies The RFM measures are directly related to Comp Sales. For example, if the number of customers visiting a store per day increases in a given period, it is very likely that it will result in increases in comp sales. However, what is not clearly known is whether an increase in the number of product trials per customer visit leads to an increase in transaction size or not. That is, the correlation between an RFM measure and a store-session is not obvious. The View module allows for such correlation studies to be performed.

Some examples of correlation studies are:
- Correlation between customer spending and duration of visit
- Correlation between customer spending and number of product trials In addition, the View module also allows a corporate marketing executive to see the impact of a particular marketing or incentive campaign. It does this by showing a comparison between a particular measure during the period of a campaign and the same period the previous year.

Customer Message Management (CMM)

The View module also allows the corporate users to specify key engagement messages for its customers. Because these customer messages are specified by a central corporate body, the View module ensures consistent and coherent messages to all customers irrespective of which sales clerk interacts with a customer. The engagement messages are preferably based on several criteria. Some illustrative criteria follow:

- The Recency-Frequency-Monetary Scorecard of a customer: A customer who makes large purchases but visits the store infrequently may be as valuable as a customer who makes small purchases but visits the store very frequently. The first customer may need significant amount of interaction time whereas the latter may need specific help on a previously research item-any more time spent might be slowing down the shopper.
- Changes in the RFM score of a customer: For example, the first sign of a retailer losing a valuable customer occurs when the Recency (R) value of her RFM scorecard starts falling. In such a scenario, the key engagement message could be to provide an incentive or reward to the customer to prevent loss of patronage
- Average duration of visit: For example, if a particular customer is a speed shopper whose average shopping speed is 20 minutes, the key engagement message would be to interact with the customer 10 minutes after she enters and ask whether the customer needs help finding any specific items. The guidance to the sales rep would also be to keep the interaction very brief.

According to one embodiment, a method for reporting information about events occurring at a physical location includes gathering data about multiple events at a physical location, the events including transactions and interactions of a person at the physical location. The information about the events is stored as metadata. Metadata about at least one event that occur at the physical location is assembled. Information about at least some of the events that occur in the physical location are displayed.

User Interface

This section describes some main tasks, which are available to a user of the CRM system according to one embodiment. Further, it provides an illustrative screenshot for each task, enumerating the steps involved in each task, thereby providing a cognitive walkthrough.

The screenshots in this example are shown as Java Applets. However, the CRM system can be written using any programming language, and can be a web-based product with JSP pages for the presentation layer. Client side code in the form of Applets may or may not be used.

There are 4 main system level tasks. These are:
1. Account Setup
2. View Store Data
3. Analyze Store Data
4. Customer Message Management (CMM)

Figure 7:
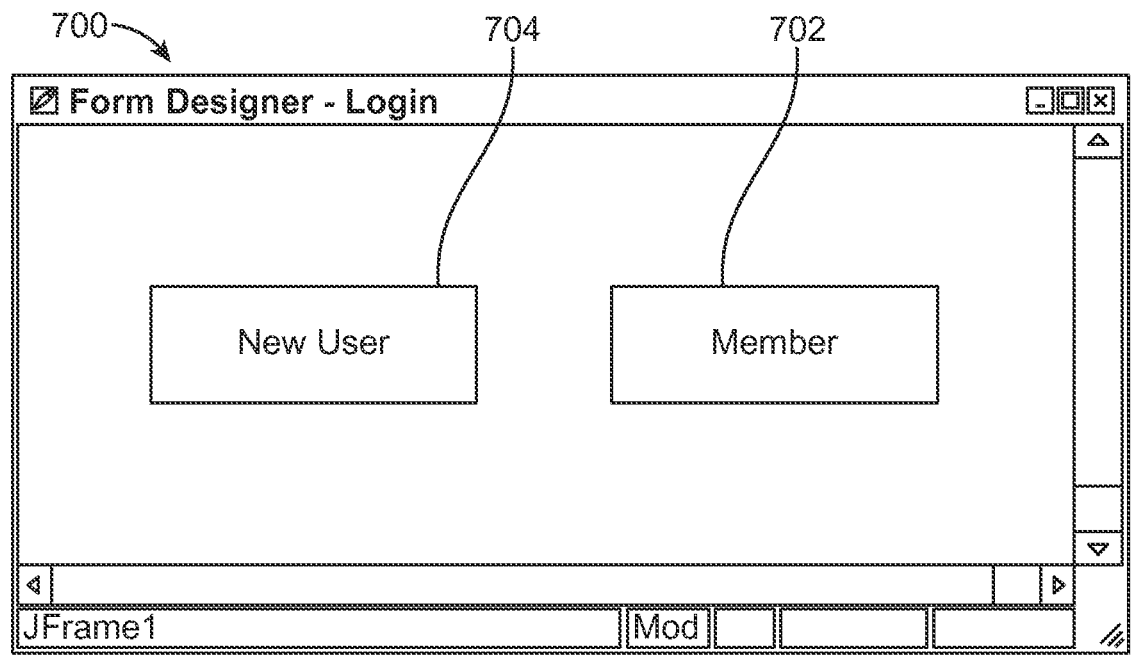
FIG. 7 illustrates a login page of an account setup process.

FIGS. 7-11 illustrate an illustrative sequence of screenshots displayed during an account setup process. FIG. 7 illustrates a login page 700. As shown, a user can login to the CRM system by selecting the Member button 702. A login ID and password may be requested, upon receipt of which, the CRM system is accessible by the user. If the user is a new user, the user selects the New User button 704 to set up preferences/options for that user.

Figure 8:
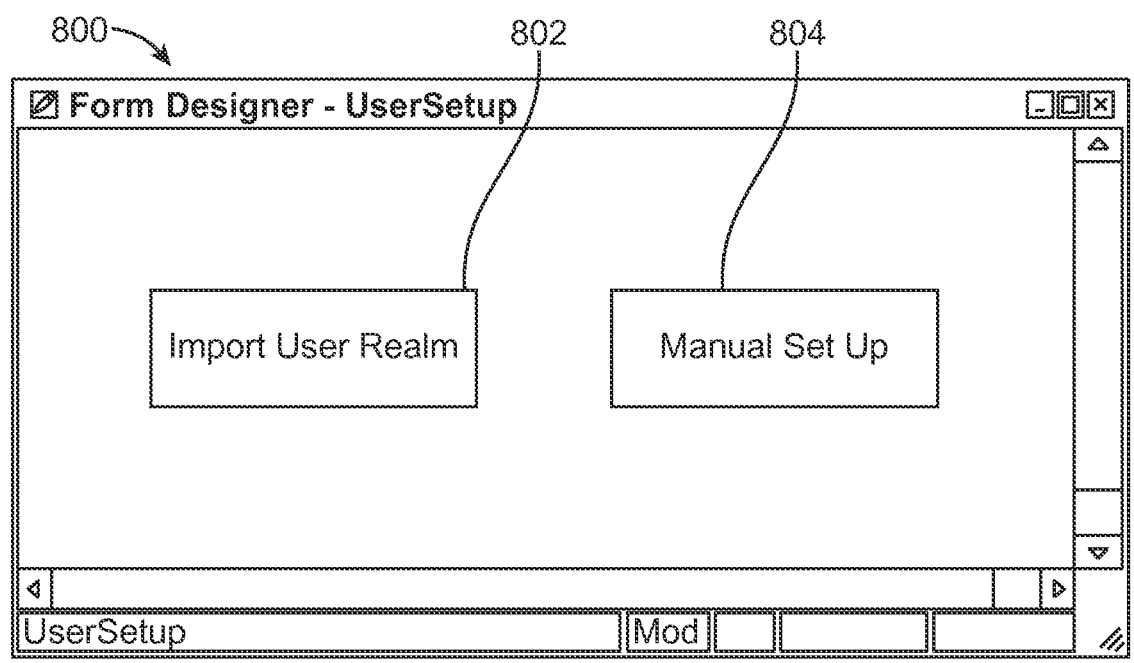
FIG. 8 depicts a new user setup screen of an account setup process.

FIG. 8 depicts a new user setup screen 800 that is displayed when the New User button of FIG. 7 has been selected. The user can choose to import an existing realm by selecting the Import User Realm button 802. An existing realm can be one already set up by another user, can be a default realm, can be selected from a list, etc.

Figure 9:
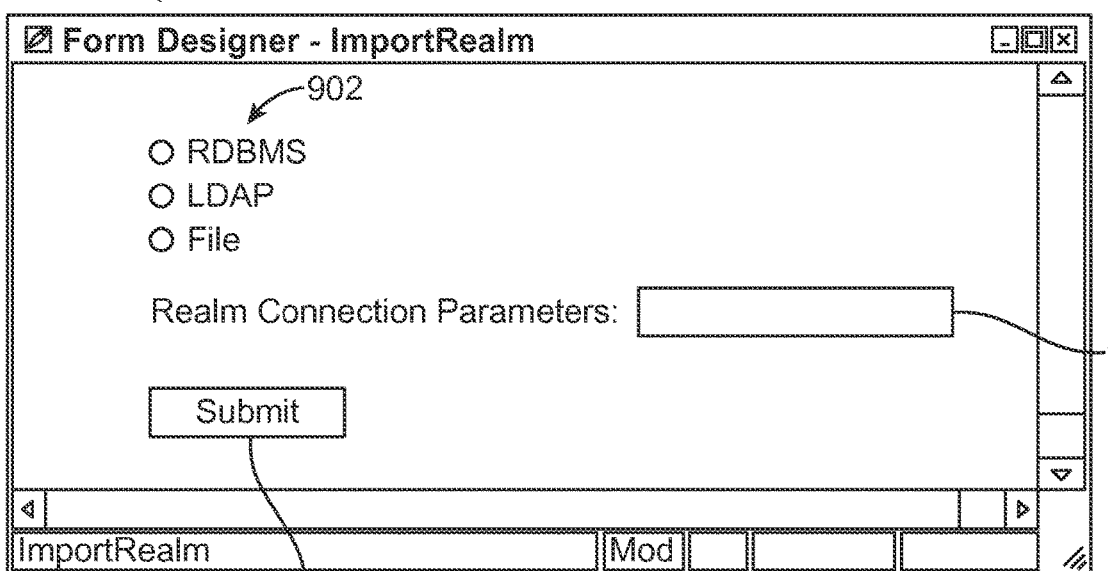
FIG. 9 shows an illustrative screen for importing a realm in an account setup process.

FIG. 9 shows an illustrative screen 900 displayed upon selection of the Import User Realm button. As shown, the user can select to import the realm via a relational database management system (RDBMS), Lightweight Directory Access Protocol (LDAP), file transfer, etc. by selecting the appropriate type from the list 902 of available types/protocols. The address/location of the realm is received in the Realm Connection Parameters field 904. The information is processed upon detecting selection of the Submit button 906.

Figure 10:
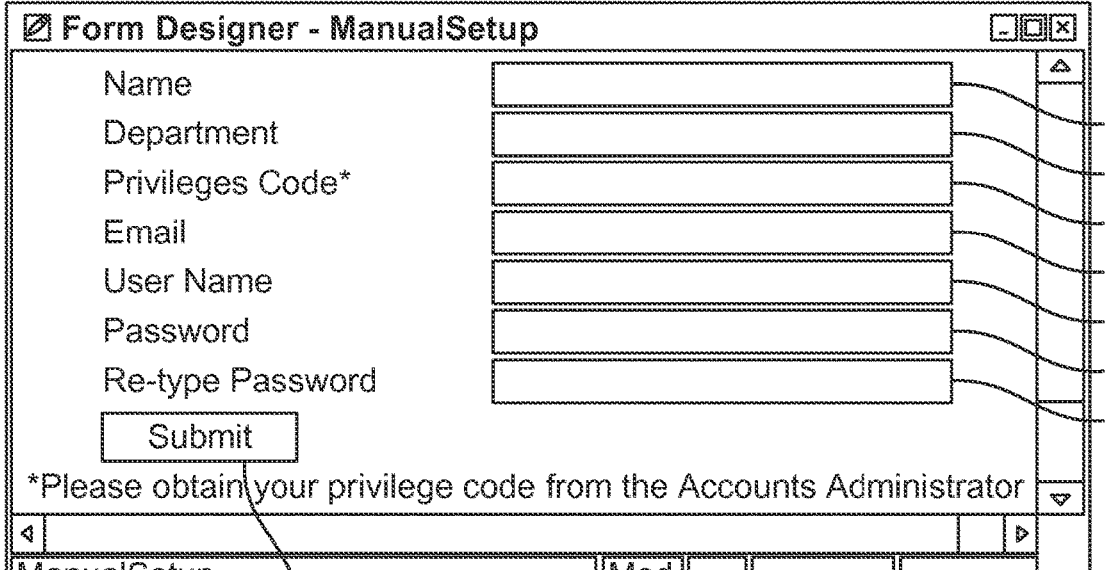
FIG. 10 illustrates a manual new user setup screen of an account setup process.

If the Manual Set Up button 804 was selected on the screen of FIG. 8, a manual new user setup screen 1000 is displayed, as shown in FIG. 10. Information about the new user is entered in the fields. For example, the user's name and department are received in the Name field 1002 and Department field 1004, respectively. A privilege code that is later used to define the user's privileges in the CRM system is received in the Privileges Code field 1006. Other fields shown include Email 1008, User Name 1010, Password 1012, Re-type Password 1014. Additional fields (not shown) may also be displayed. The information is processed upon detecting selection of the Submit button 1016.

Figure 11:
FIG. 11 depicts a privileges screen that displays the privileges of the user.

FIG. 11 depicts a privileges screen 1100 that displays the privileges of the user. As shown, the privileges can be separated into functional privileges and regional privileges.

Figure 12:
FIG. 12 illustrates a screen that allows selection of a type of store data measure to output.

FIGS. 12-16 illustrate exemplary screenshots that allow a user to show (retail) store data. FIG. 12 illustrates a screen 1200 that allows selection of a type of measure. In this example, the measures are RFM and Store Session. If RFM is selected, the screen 1300 shown in FIG. 13 is displayed to allow a user to select the type of RFM measure. If Store Session was selected on the screen of FIG. 12, the screen 1400 of FIG. 14 is displayed. This screen allows the user to select one or more types of store session measures to output.

Figure 15:
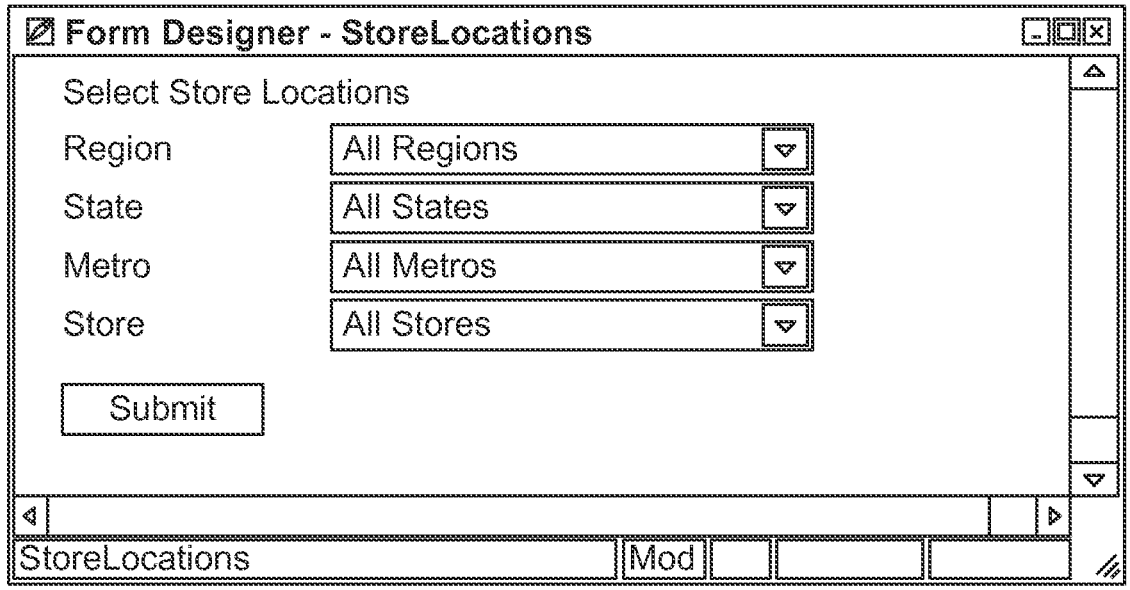
FIG. 15 shows a screen that allows the user to define the store locations for which store data is calculated.
Figure 16:
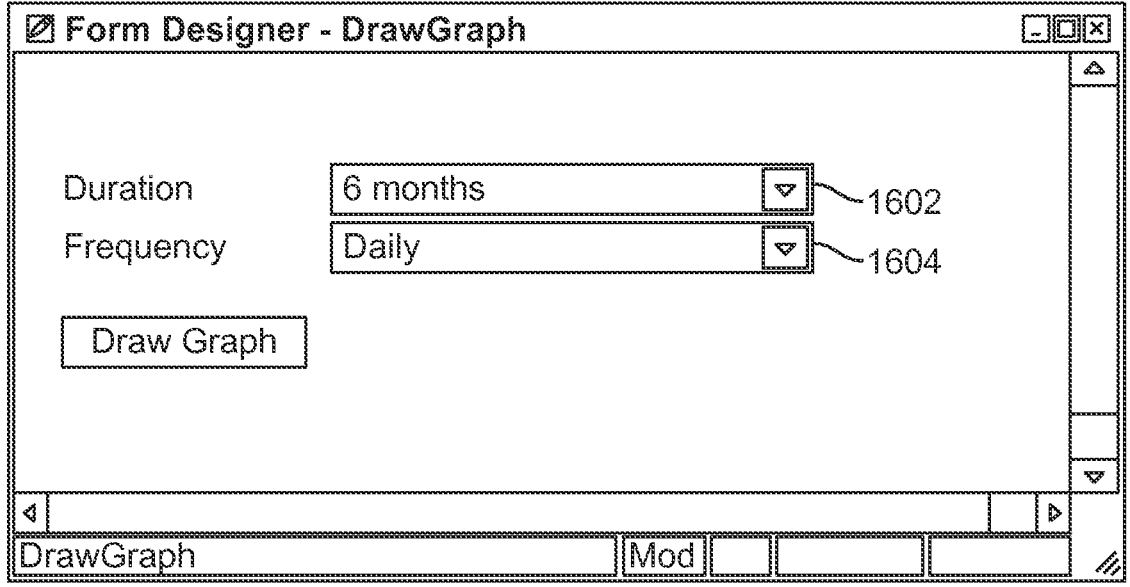
FIG. 16 illustrates a screen that allows the user to select the duration and frequency of the store data to be output.
Figure 19:
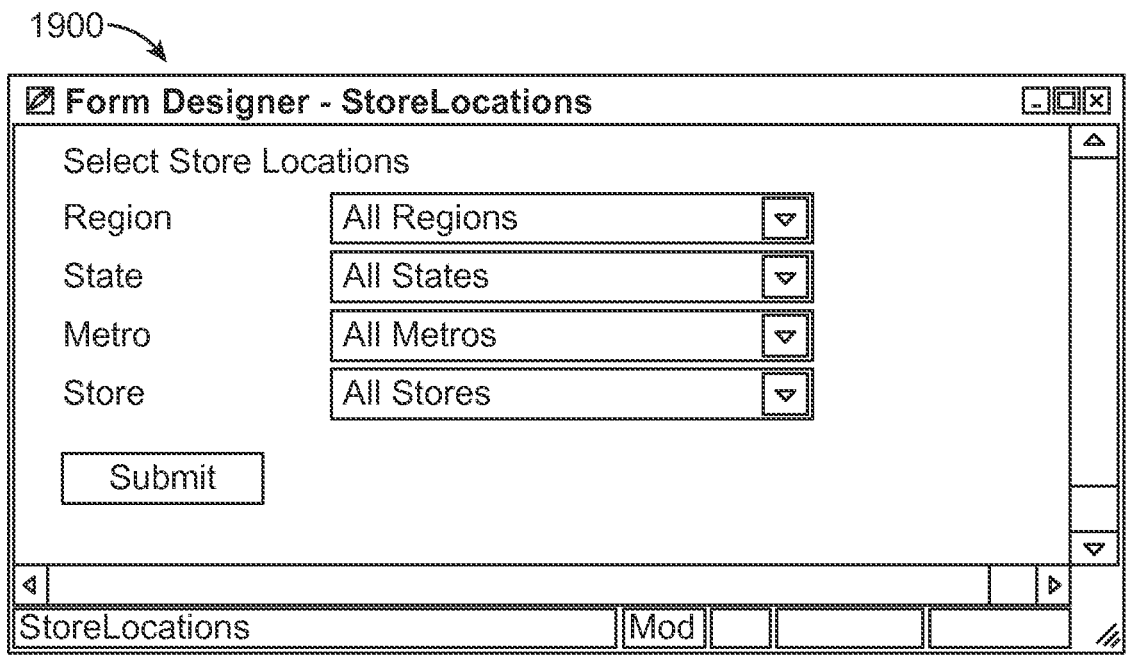
FIG. 19 depicts a screen that allows a user to define the store locations for which store data is analyzed for the correlation study.

The screen 1500 of FIG. 15 allows the user to define the store locations for which the results of the selections chosen in screen 1200, 1300 and/or 1400 are calculated. FIG. 16 illustrates a screen 1600 with fields 1602, 1604 that allows the user to select the duration and frequency of the store data to be output. A graph (not shown) of the store data is then generated for the selected time frame and frequency, and according to the parameters set by the user in the previous screens 1200, 1300, 1400 and/or 1500.

FIGS. 17-26 illustrate exemplary screenshots that analyze (retail) store data. FIG. 17 illustrates a screen 1700 that allows selection of a type of analysis. In this example, the types of analyses available are an impact study and a correlation study. The screen 1800 shown in FIG. 18 is displayed if a correlation study has been selected. This screen allows selection of one or more RFM and store-session measures. The screen 1900 of FIG. 19 allows the user to define the store locations for which the results of the selections chosen in screen 1700 and/or 1800 are calculated.

Figure 20A:
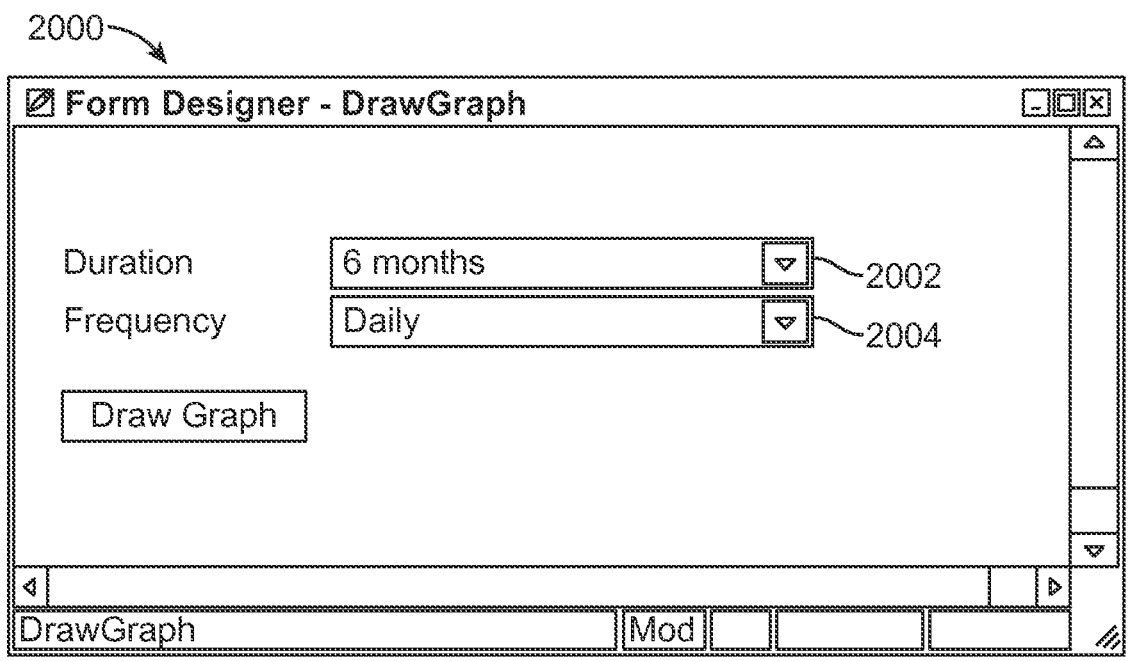
FIG. 20A illustrates a screen that allows a user to select the duration and frequency of the store data to be output.
Figure 20B:
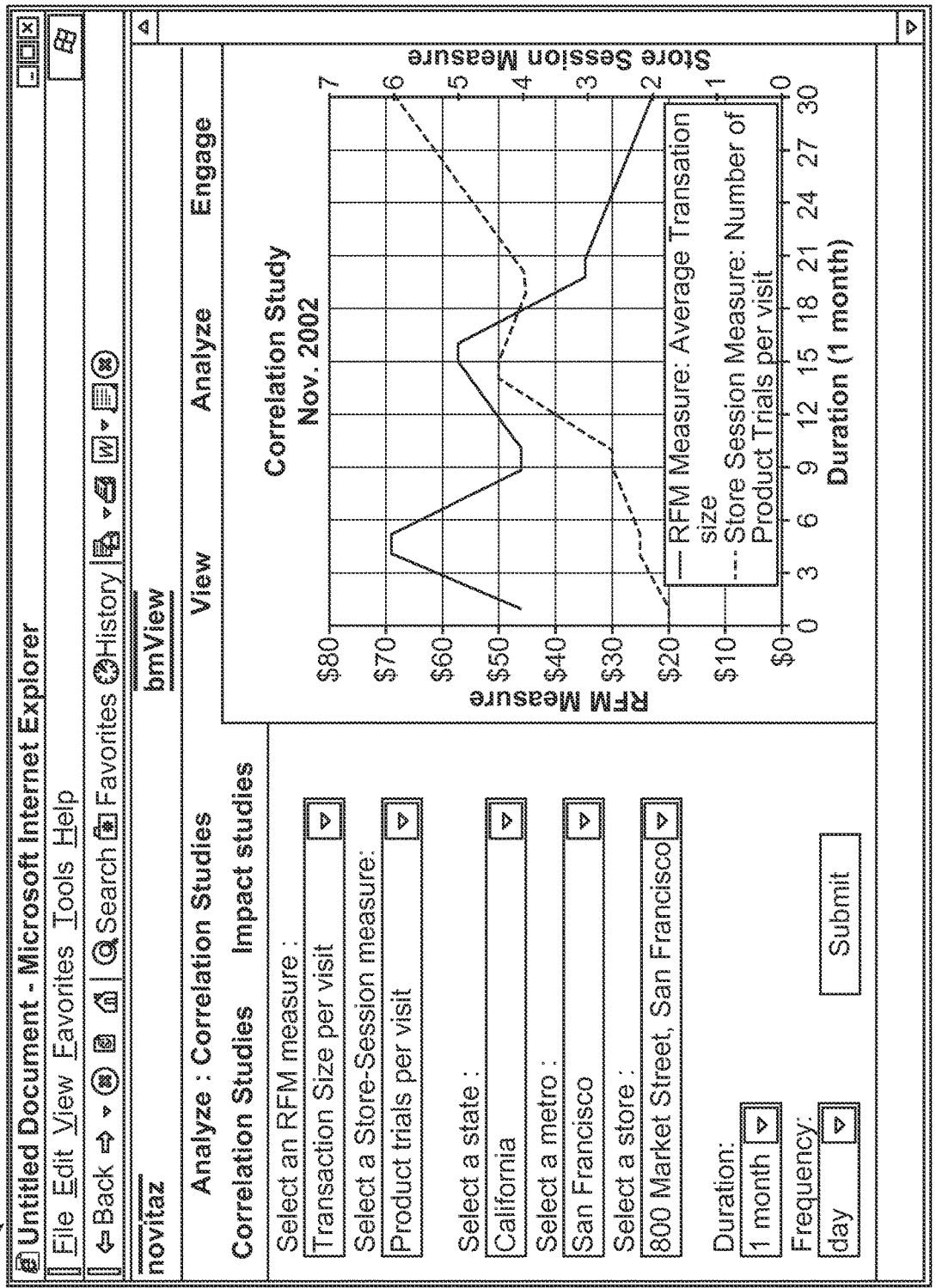
FIG. 20B illustrates an output page displaying the results of the correlation study in a browser.
Figure 21:
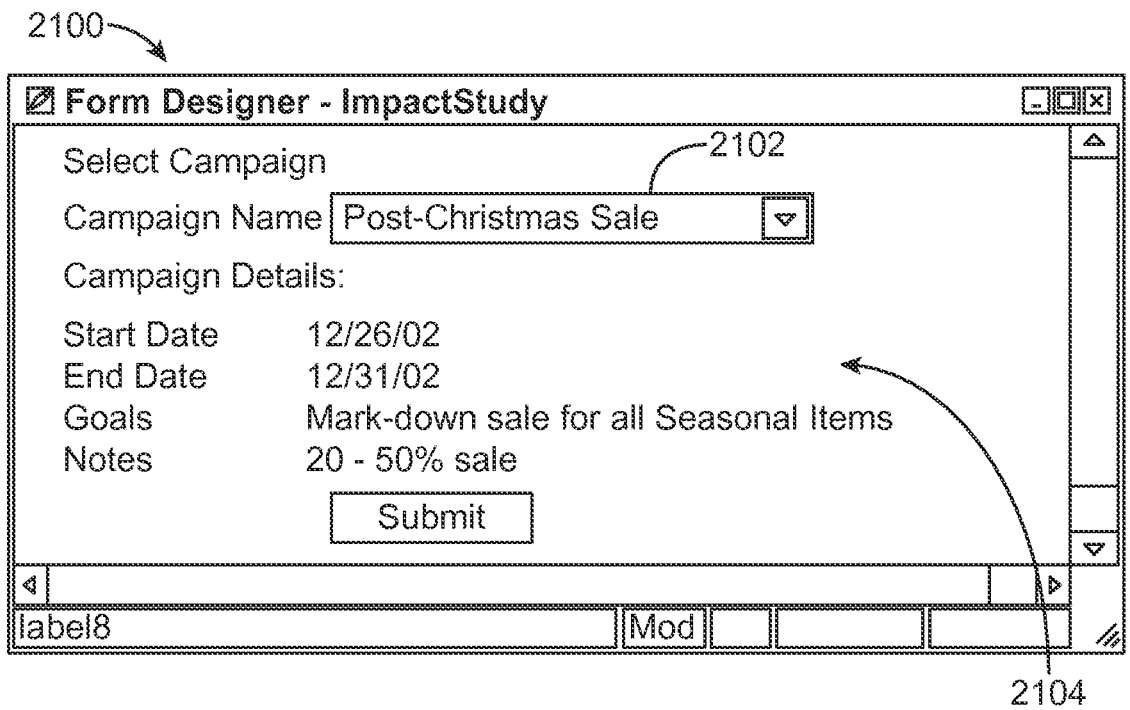
FIG. 21 depicts a screen that allows selection of a campaign for an impact study.

FIG. 20A illustrates a screen 2000 with fields 2002, 2004 that allows the user to select the duration and frequency of the store data to be output. As shown in FIG. 20B, an output screen 2050 displaying a graph of the store data analysis is then generated for the selected time frame and frequency, and according to the parameters set by the user in the previous screens 1700, 1800 and/or 1900. As shown, the parameters of the results preferably can be modified on the screen as well.

Figure 22:
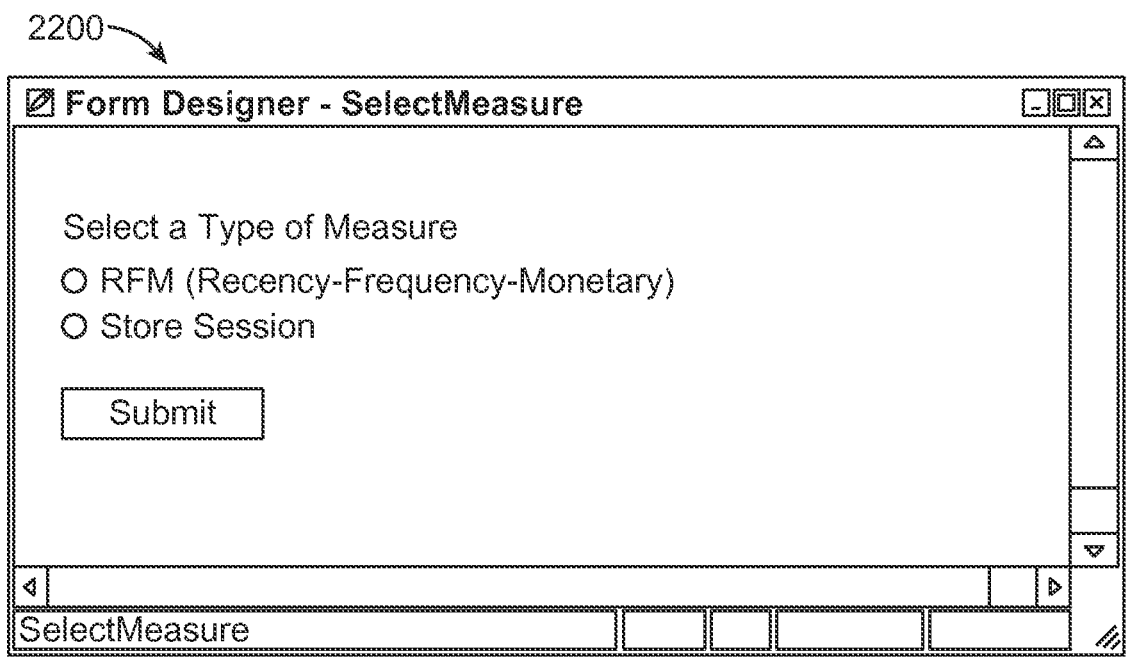
FIG. 22 illustrates a screen that allows selection of a type of measure for an impact study.
Figure 23:
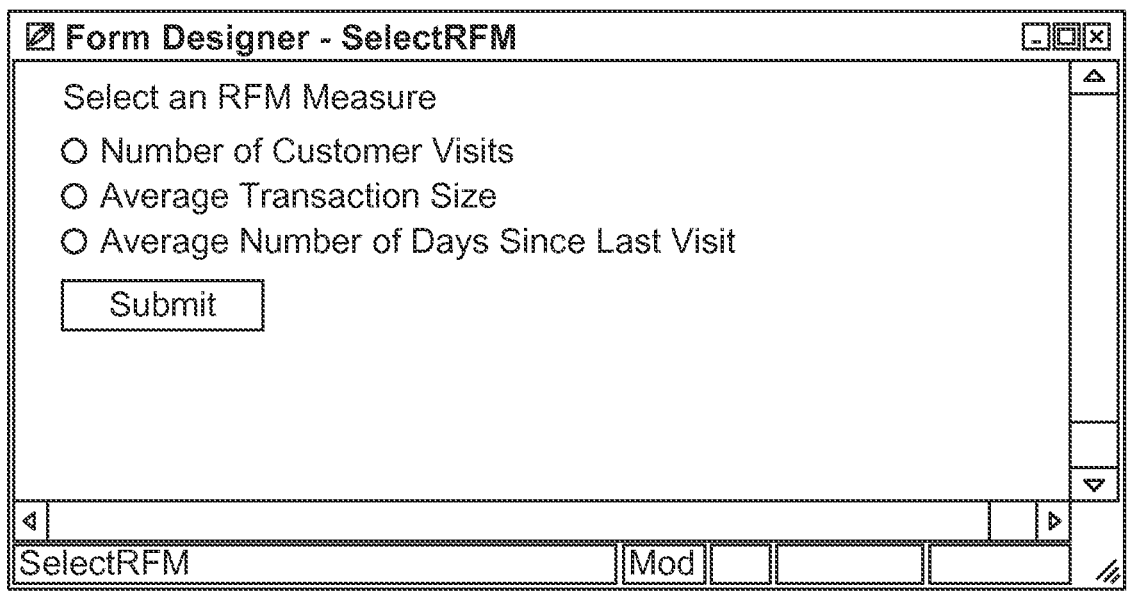
FIG. 23 shows a screen that is displayed to allow a user to select a type of RFM measure to use for the impact study.
Figure 24:
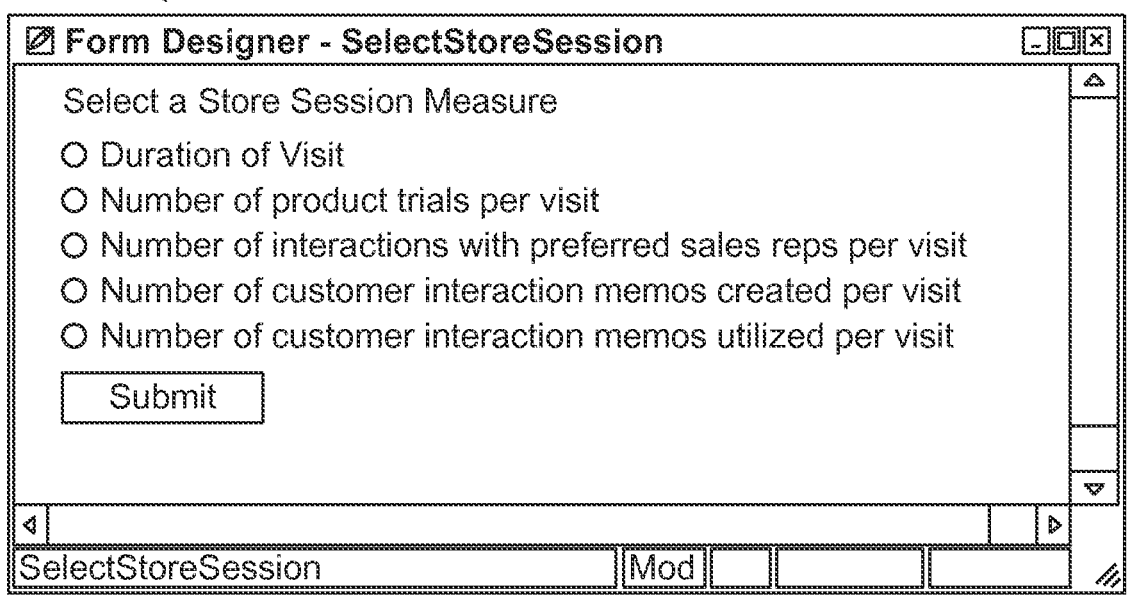
FIG. 24 depicts a screen that allows the user to select one or more types of store session measures to output for the impact study.

If an impact study was selected in screen 1700, screen 2100 (FIG. 21) is displayed. This screen allows selection of a campaign, e.g., promotion, sale, etc. by selecting or entering a particular promotion in field 2102. Details 2104 about the selected campaign are also displayed. FIG. 22 illustrates a screen 2200 that allows selection of a type of measure. In this example, the measures are RFM and Store Session. If RFM is selected, the screen 2300 shown in FIG. 23 is displayed to allow a user to select the type of RFM measure. If Store Session was selected on the screen of FIG. 22, the screen 2400 of FIG. 24 is displayed. This screen allows the user to select one or more types of store session measures to output.

The screen 2500 of FIG. 25 allows the user to define the store locations for which the results of the selections chosen in screen 2100, 2200, 2300, and/or 2400 are calculated. FIG. 26 illustrates a screen 2600 with fields 2602, 2604 that allows the user to select the duration and frequency of the store data to be output. A graph (not shown) of the store data is then generated for the selected time frame and frequency, and according to the parameters set by the user in the previous screens 2100, 2200, 2300, 2400 and/or 2500.

FIGS. 27-30 illustrate various screens for customer message management according to one embodiment. In this example, screen 2700 of FIG. 27 allows a user to select an objective of an engagement message. Exemplary objectives are customer retention (e.g., to maintain the RFM score), prevention of customer loss (e.g., to respond to a drop in the RFM score), and to provide an incentive to the customer (e.g., to increase the RFM score).

FIG. 28 depicts the screen 2800 displayed upon selection of the Customer Retention objective on screen 2700. In this example, a total of nine engagement messages can be created corresponding to Low, Mid and High RFM Scores, as determined by the user-selectable settings of the RFM score fields 2802, 2804, 2806. The message is received in field 2808 and correlated to the settings of the score fields upon selection of the Submit button 2810.

Figure 29:
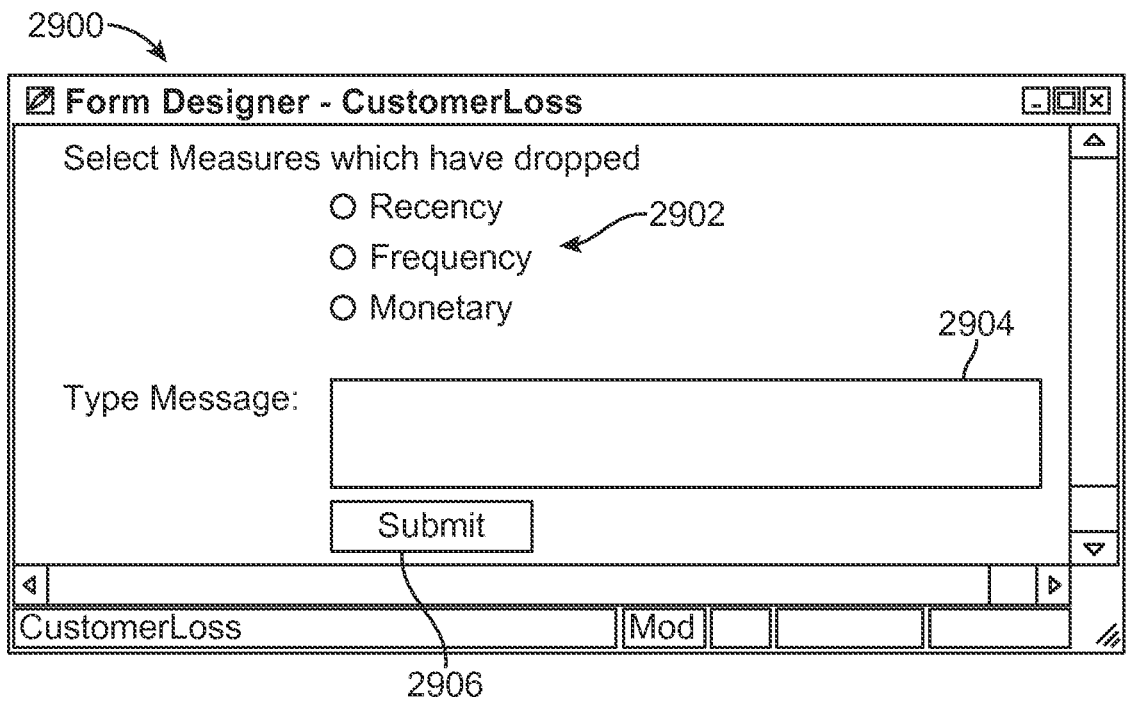
FIG. 29 depicts a screen for creating a message for prevention of customer loss.

FIG. 29 depicts the screen 2900 displayed upon selection of the Prevention of Customer Loss objective on screen 2700. In this example, a total of seven engagement messages can be created corresponding to drop in R, F, M, RF, FM, RM, RFM, as indicated by user selection of the desired RFM measures 2902. The message is received in field 2904 and correlated to the selected of the RFM measure(s) upon selection of the Submit button 2906.

Figure 30:
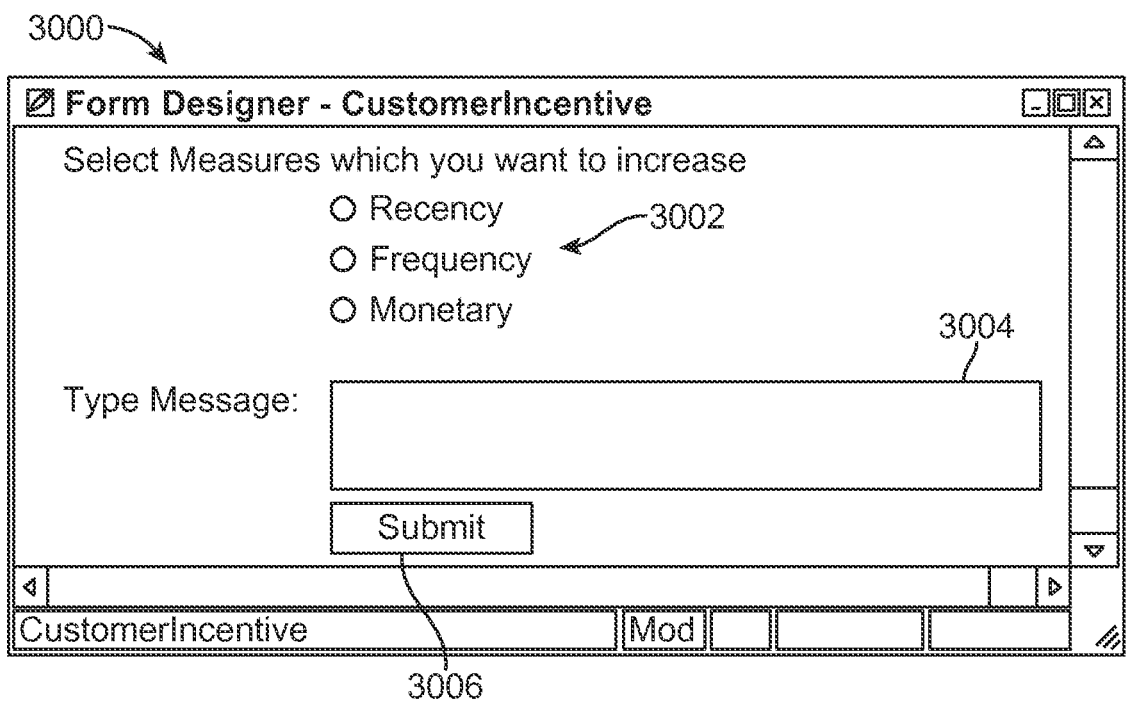
FIG. 30 illustrates a screen for creating a message for providing a customer incentive.

FIG. 30 depicts the screen 3000 displayed upon selection of the Customer Incentive objective on screen 2700. In this example, a total of seven engagement messages can be created corresponding to the measure(s) to be increased (R, F, M, RF, FM, RM, RFM), as indicated by user selection of the desired RFM measures 3002. The message is received in field 3004 and correlated to the selected of the RFM measure(s) upon selection of the Submit button 3006.

Figure 31A:
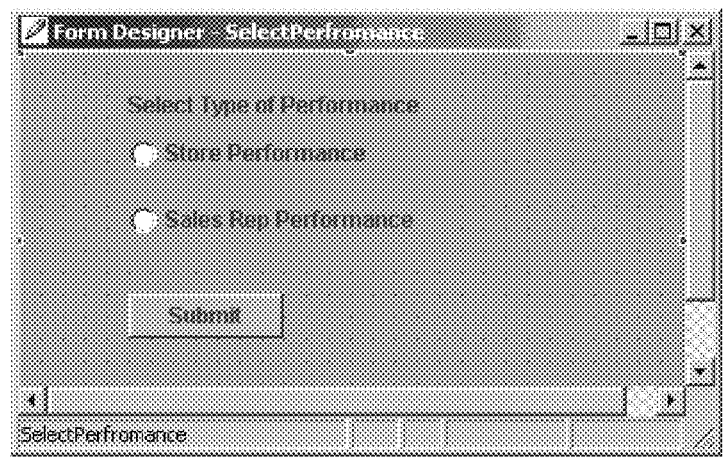
FIG. 31A illustrates a screen that allows selection of a type of performance to analyze.
Figure 31B:
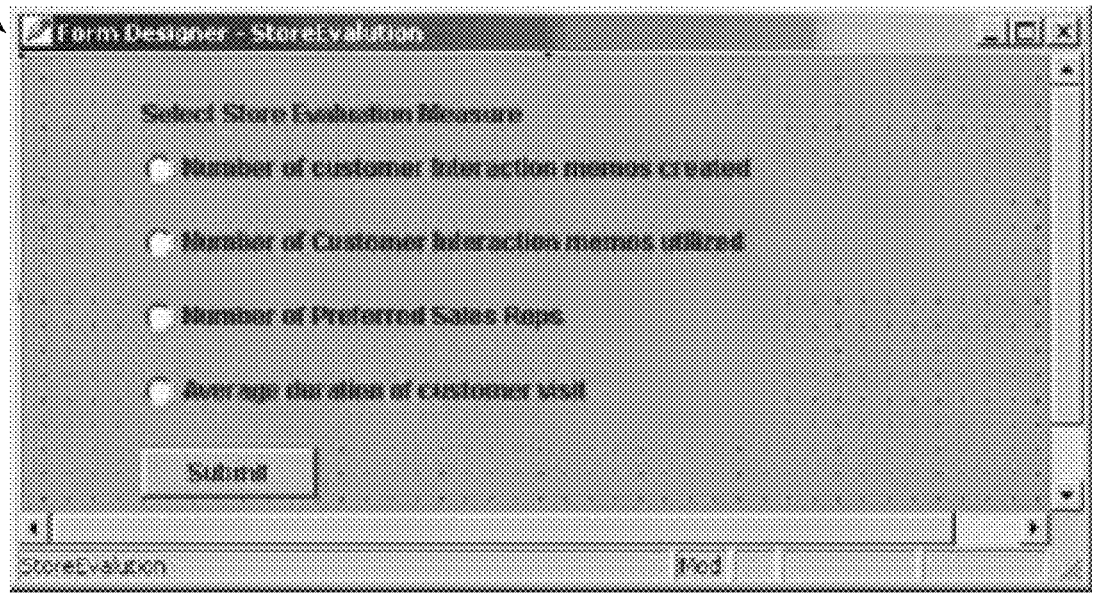
FIG. 31B depicts a screen displayed if Store Performance has been selected on the screen of FIG. 31A.
Figure 31C:
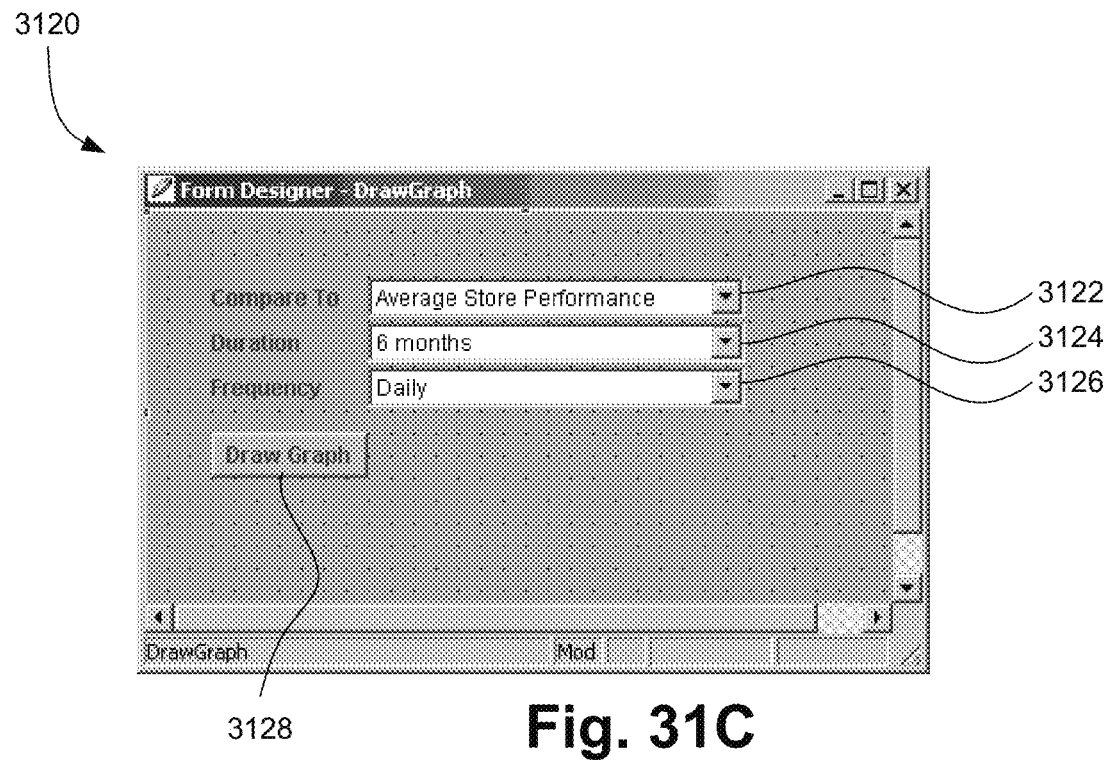
FIG. 31C illustrates a screen that allows a user to select the duration and frequency of the evaluation data to be output.

FIGS. 31A-F illustrate exemplary screenshots that analyze store and/or sales representative performance. FIG. 31A illustrates a screen 3100 that allows selection of a type of performance to analyze. In this example, the types of performances available are store performance and sales rep performance. The screen 3110 shown in FIG. 31B is displayed if Store Performance has been selected. This screen allows selection of one or more evaluation measures. FIG. 31C illustrates a screen 3120 with fields 3122, 3124, 3126 that allows the user to select the duration and frequency of the store performance data to be output. The performance data is preferably output in visual form upon selection of the Draw Graph button 3128.

Figure 31D:
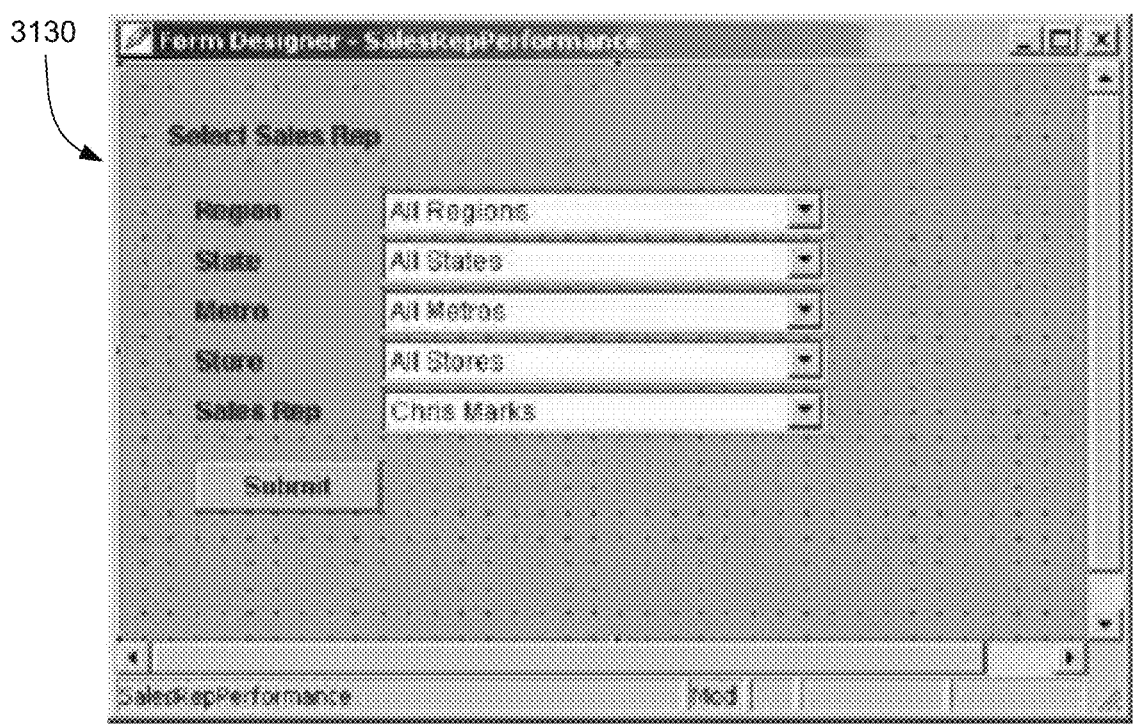
FIG. 31D depicts a screen displayed if Sales Rep Performance has been selected on the screen of FIG. 31A.
Figure 31E:
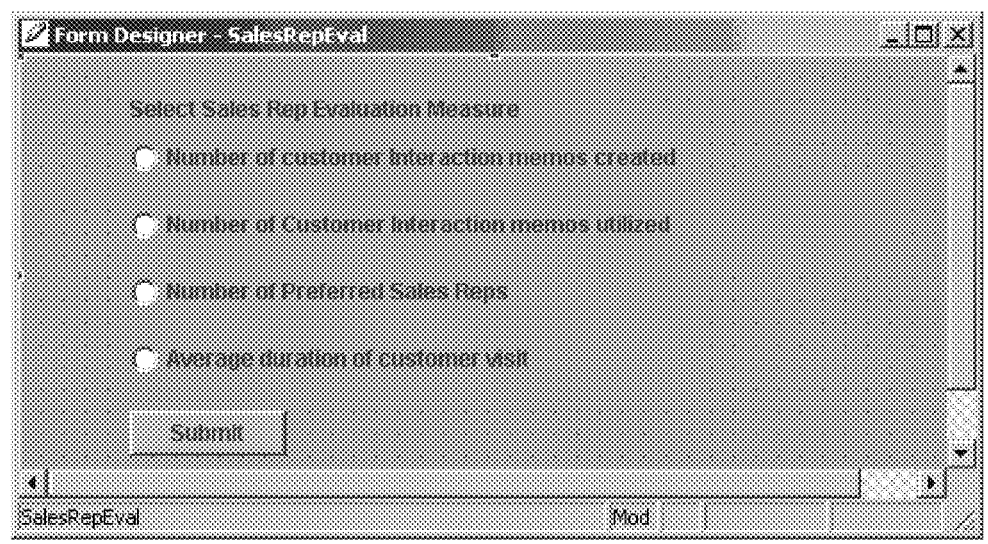
FIG. 31E shows a screen that allows selection of one or more evaluation measures which can be used to perform the evaluation.
Figure 31F:
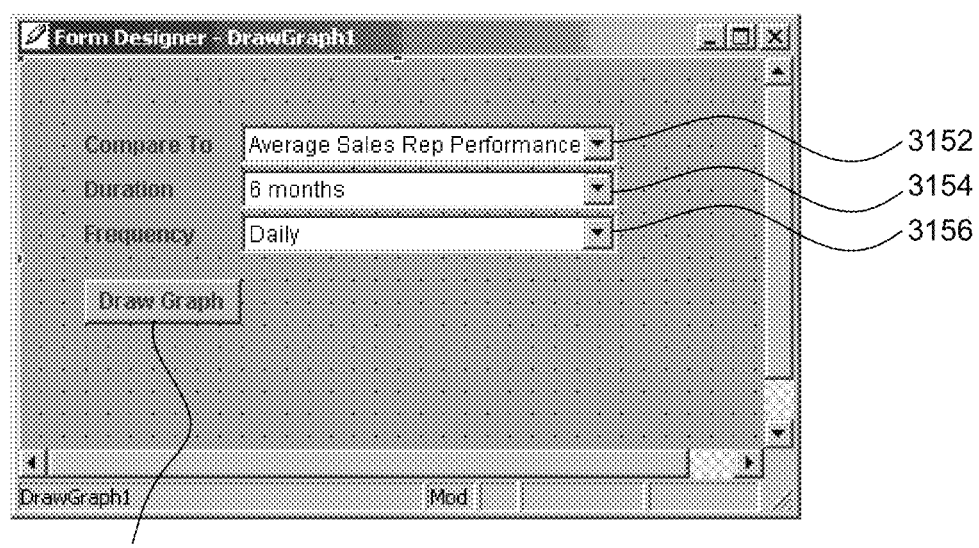
FIG. 31F illustrates a screen allows the user to select the duration and frequency of the sales rep performance data to be output.

If Sales Rep Performance was selected on screen 3100, the screen 3130 of FIG. 31D allows the user to specify a group of sales representatives down to a particular sales rep. The screen 3140 shown in FIG. 31E allows selection of one or more evaluation measures which can be used to perform the evaluation. FIG. 31F illustrates a screen 3150 with fields 3152, 3154, 3156 that allows the user to select the duration and frequency of the sales rep performance data to be output. The performance data is preferably output in visual form upon selection of the Draw Graph button 3158.

Use Cases

Following are several exemplary "Use Cases" which provide generic descriptions of the overall functionality of the CRM system of the present invention. The Use Cases are used to describe the interactions between the classes of the software system and the actors. A scenario is one particular set of interactions between use-cases and actors. Actors are the system components or humans that perform certain tasks.

In the following paragraphs, the relationship of actors and Use Cases for restaurant and retail solutions will be described. Each Use Case diagram includes the description and the actors. The Use Case title is the specific task actors will perform when the actors send a particular stimulus to the system. The following 5 scenarios have been modeled:
1. Send Reward Card to VIP Customers by mail
2. Award VIP Customer Status at POS
3. Identify a returning customer who has a bmRewards Card
4. Engage with the returning customer who has a bmRewards Card
5. Close a bmSession of a returning customer Scenario 1: Send Reward Card to VIP Customers by Mail
Actors

| Actor: Campaign Manager | Type of Actor: User |
| Actor: VIP Database/Corp CRM System | Type of Actor: External System |
| Actor: Reward Card Printing System | Type of Actor: External System |
| Actor: Retailer Reward Card Mailing Sys. | Type of Actor: External System |

Scenario Description

Figure 32A:
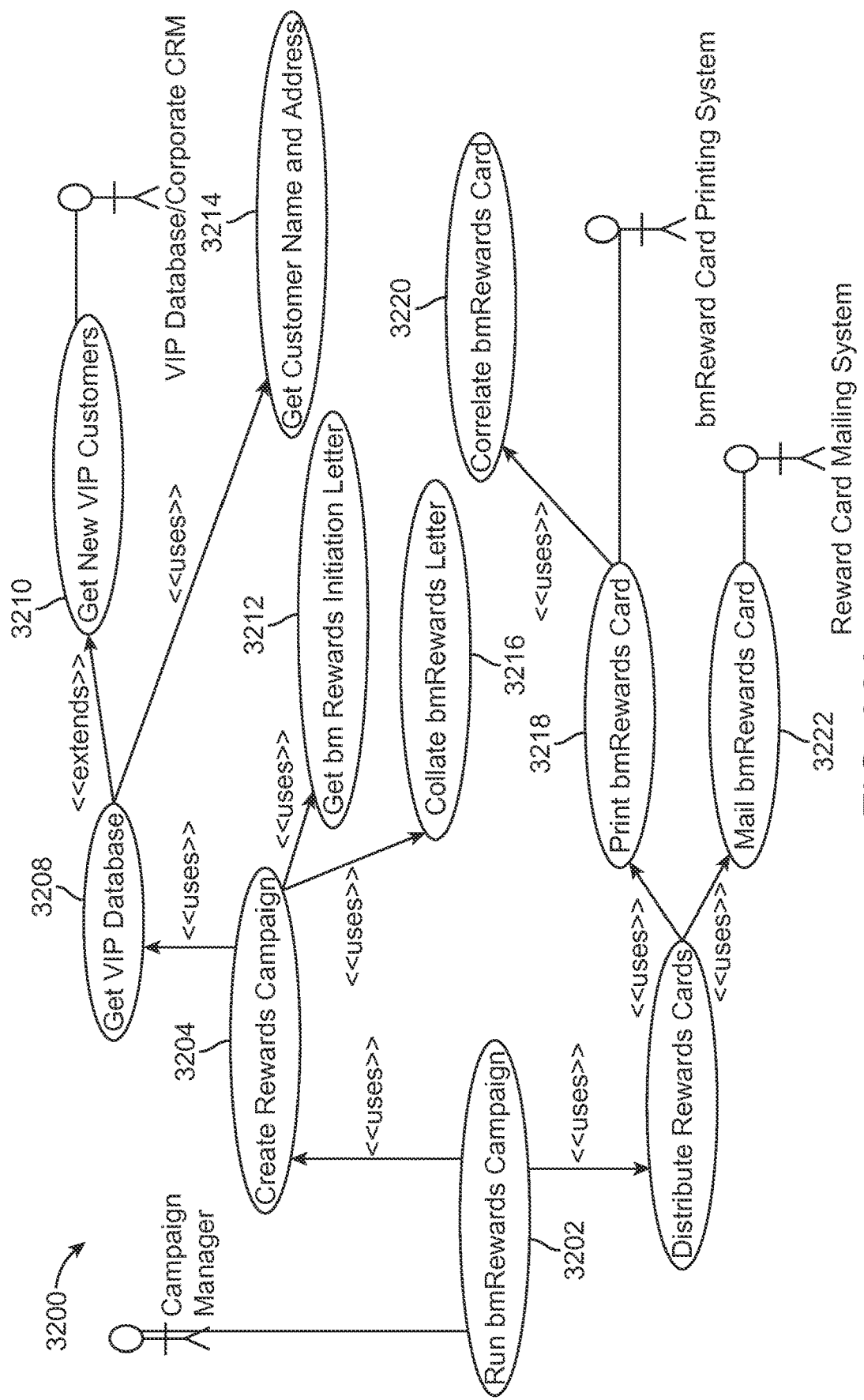
FIG. 32A is a flow diagram of a scenario for sending a reward card to a customer by mail.

This scenario starts when a Marketing campaign manager initiates the "Run Rewards Campaign" use case. The intermediate steps of the scenario are detailed in the description below and in FIG. 32A, which is a flow diagram of the Use-Case 3200 for sending a reward card to a VIP customer by mail. The scenario ends with the printing and mailing of Reward Cards.

Use Case Titles and Description

Title 3202: Run bmRewards Campaign—This Use Case comprises the two main use cases in this scenario: the "Create Rewards Campaign" use case and the "Distribute Rewards Card" use case.

Title 3204: Create Rewards Campaign—This Use Case includes all the steps required for determining the distribution list and creating the campaign letters.

Title 3208: Get VIP List—This Use Case interfaces with the VIP Database and/or the Corporate CRM system.

Title 3210: Get New VIP Customers—This Use Case only returns VIP customers who have not received a bmRewards Card before.

Title 3212: Get bmRewards Initiation Letter—This Use Case receives the text of the letter, which the new VIP customers will receive.

Title 3214: Get Customer Name and Address—This Use Case returns the mailing address of the VIP Customers.

Title 3216: Collate bmRewards Letter—This Use Case collates the VIP customers with the text of the bmRewards Initiation letter and creates one letter per customer.

Title 3218: Print bmRewards Card—This Use Case receives the Customer Names and interfaces with the bmReward Print System.

Title 3220: Correlate bmRewards Card—This Use Case correlates the RFID tag information on the card with the Customer Information.

Title 3222: Mail bmRewards Card—This Use Case sends a message to the Retailer Rewards Mailing System stating that the bmRewards Card and the letters are ready for mailing.

Scenario 2: Award VIP Customer status at POS
Actors

| | |
|---|---|
| Actor: POS Clerk | Type of Actor: User |
| Actor: New Customer | Type of Actor: User |
| Actor: POS System | Type of Actor: External System |
| Actor: VIP Database/Corporate CRM | Type of Actor: External System |

Scenario Descriptions

Figure 32B:
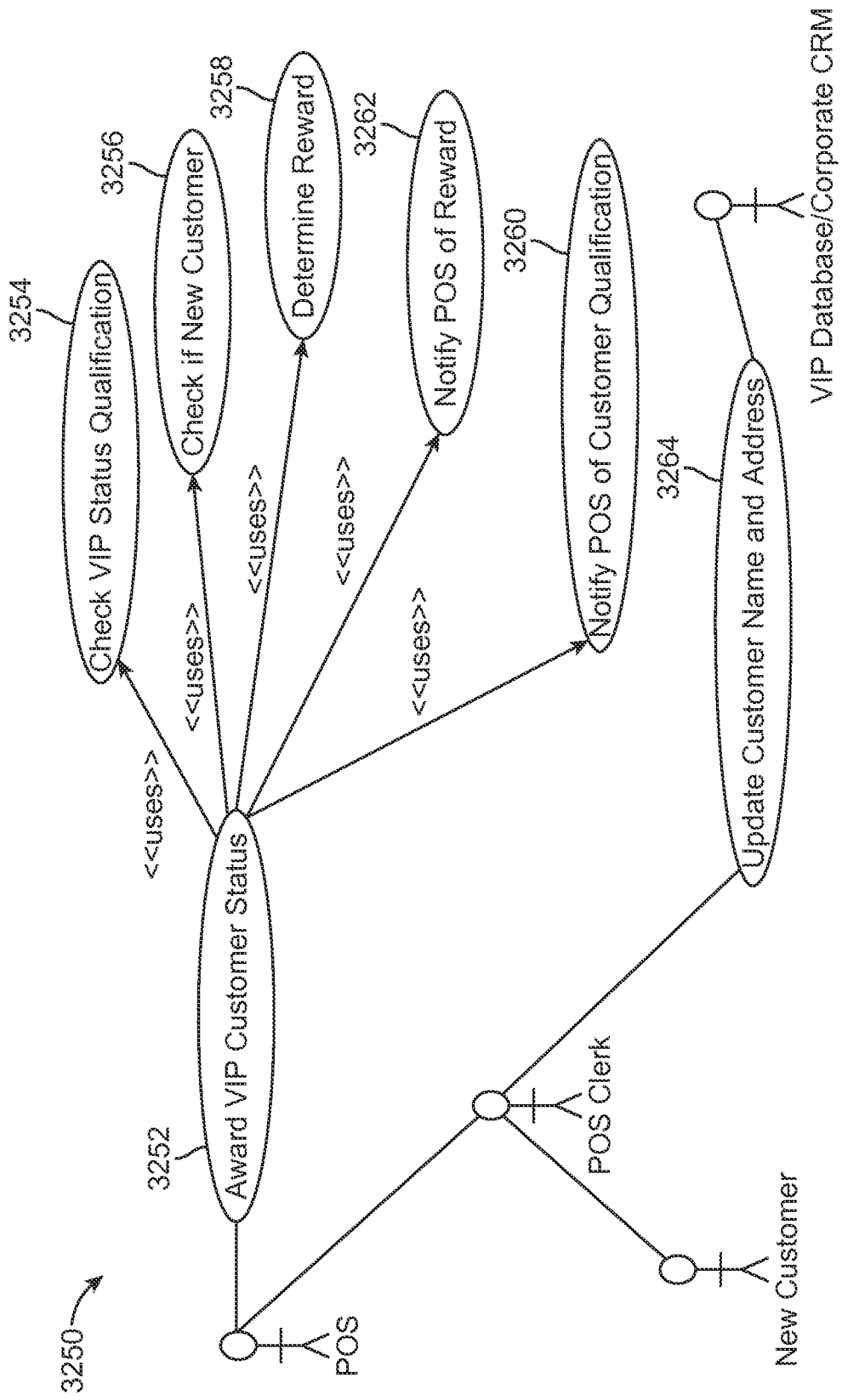
FIG. 32B is a flowchart of a scenario for awarding VIP customer status at the POS.

FIG. 32B is a flowchart of a scenario 3250 for awarding VIP customer status at the POS. This scenario starts when the POS system sends the purchase information of a user to the "Award bmRewards Card" module. The intermediate steps of the scenario are detailed in the description below and in the scenario diagram. The scenario ends with the POS clerk awarding a VIP customer status to the new customer. The POS clerk provides a hand-out explaining how the bmRewards card works and that a bmRewards Card will be sent by mail Use Case Titles and Descriptions Title 3252: Award VIP Customer Status—This Use Case gets the purchase information of a customer from the POS in real-time. It calls the "Check VIP-Status Qualification" use case.

Title 3254: Check VIP-Status Qualification—This Use Case checks whether the customer qualifies for a VIP or preferred Status Title 3256: Check if New Customer—This Use Case checks if the customer is not already a VIP customer Title 3258: Determine Reward—If the new customer qualifies for a VIP status, then this Use Case determines the reward to be given in order to incentivize the customer to return. Please note, the reward could be a service-based reward, for example it could be something like a free make-up (Stores like Sephora provide such incentives).

Title 3260: Notify POS Clerk of Customer Qualification for VIP status—This Use Case sends a message to the monitor of the POS clerk notifying her that the new customer qualifies for a VIP status.

Title 3262: Notify POS Clerk of Reward—This Use Case sends a message to the monitor of the POS clerk notifying her of the reward the customer has received. The POS clerk can convey this verbally to the customer, stating that the given reward will be documented in the letter Title 3264: Update Customer Name and Address—If the customer accepts the VIP status then the POS clerk gets the customer's name and mailing address and updates this information.

Title (not shown): Send Customer Update to Corporate CRM—This Use Case sends the customer information to the corporate CRM/corporate VIP customer database.

Scenario 3: Start bmSession with a Returning Customer
Actors

| | |
|---|---|
| Actor: VIP Customer | Type of Actor: User |
| Actor: Manager | Type of Actor: User |
| Actor: RF Readers | Type of Actor: External System |
| Actor: RF Adapter | Type of Actor: External System |
| Actor: VIP Database/Corporate CRM | Type of Actor: External System |
| Actor: Printer | Type of Actor: External System |

Scenario Description

Figure 33:
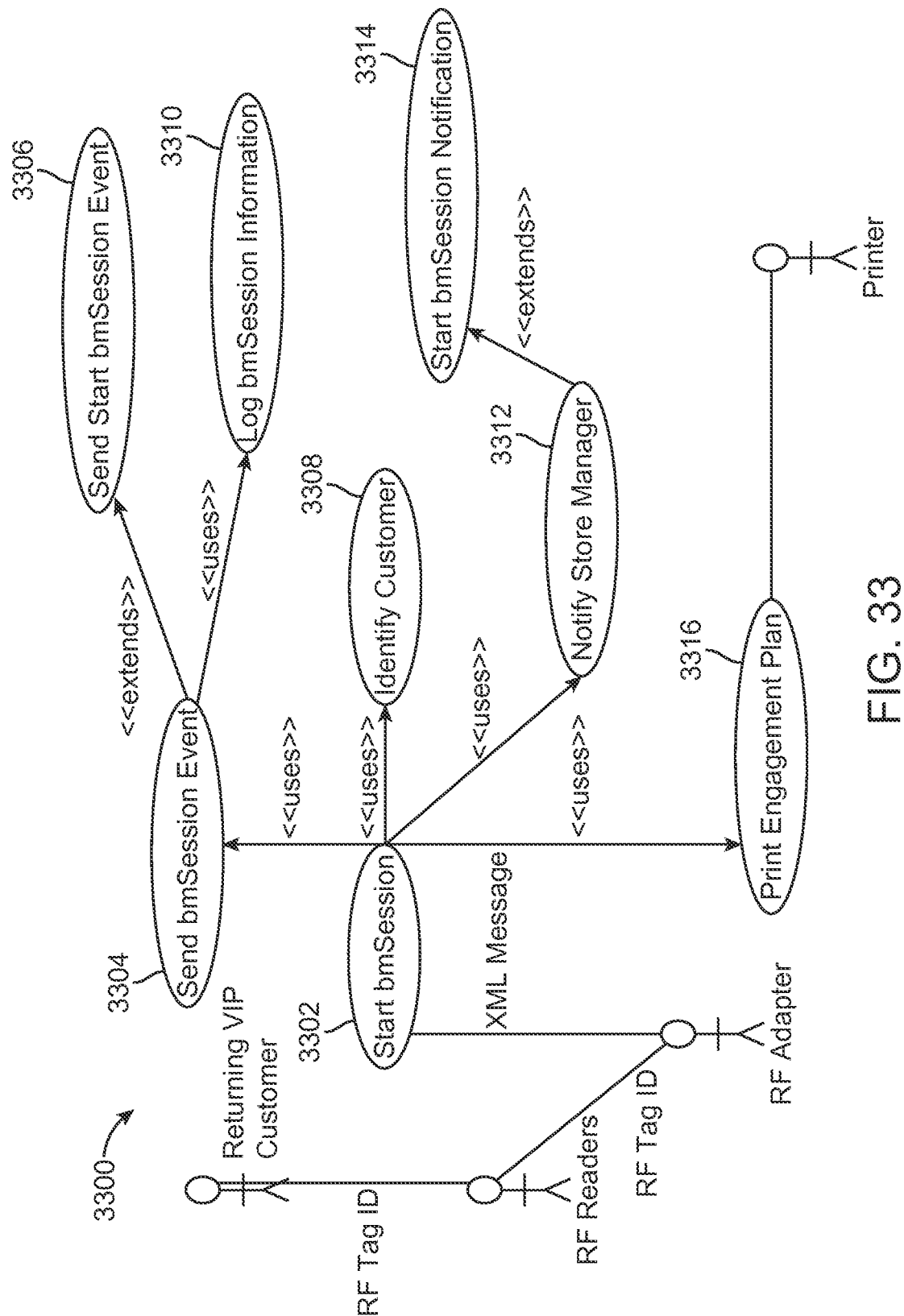
FIG. 33 is a flowchart of a scenario for starting a session with a returning customer.

FIG. 33 is a flowchart of a scenario 3300 for starting a session with a returning customer. This scenario starts when a VIP Customer returns to the store. The RF Reader sends the sensed RF Tag information to the bmIdentification module. The scenario ends with the store manager being notified of the returning VIP customer and an engagement plan being printed for the manager Use Case Titles and Descriptions Title 3302: Start bmSession—This Use Case handles the start of a bmSession for the customer. It extends the Handle bmSession Use Case, which is the generic use case when any bmSession event occurs.

Title 3304: Send bmSession Event—This Use Case sends the bmSession event to the subscribers of the event.

Title 3306: Send Start bmSession Event—This Use extends the bmSession event by sending the Start Event.

Title 3308: Identify Customer—This Use Case uses the RFID signature to identify the customer.

Title 3310: Log bmSession Information—This Use Case logs the bmSession Information.

Title 3312: Notify Store Manager—This Use Case notifies the store manager of a bmSession event.

Title 3314: Start bmSession Notification—This Use Case extends the Notify Store Manager Use case by notifying the store manager of the start bmSession event.

Title 3316: Print bmEngagement Plan—This Use Case prints the engagement plan for the manager. Note, the engagement plan contains the preferred sales rep for the customer. The manager can then page the sales rep, which starts off the next use case scenario.

Scenario 4: Engage with a Returning VIP Customer
Actors

| | |
|---|---|
| Actor: VIP Customer | Type of Actor: User |
| Actor: Manager | Type of Actor: User |
| Actor: RF Readers | Type of Actor: External System |
| Actor: RF Adapter | Type of Actor: External System |
| Actor: VIP Database/Corporate CRM | Type of Actor: External System |
| Actor: Printer | Type of Actor: External System |

Scenario Description

Figure 34:
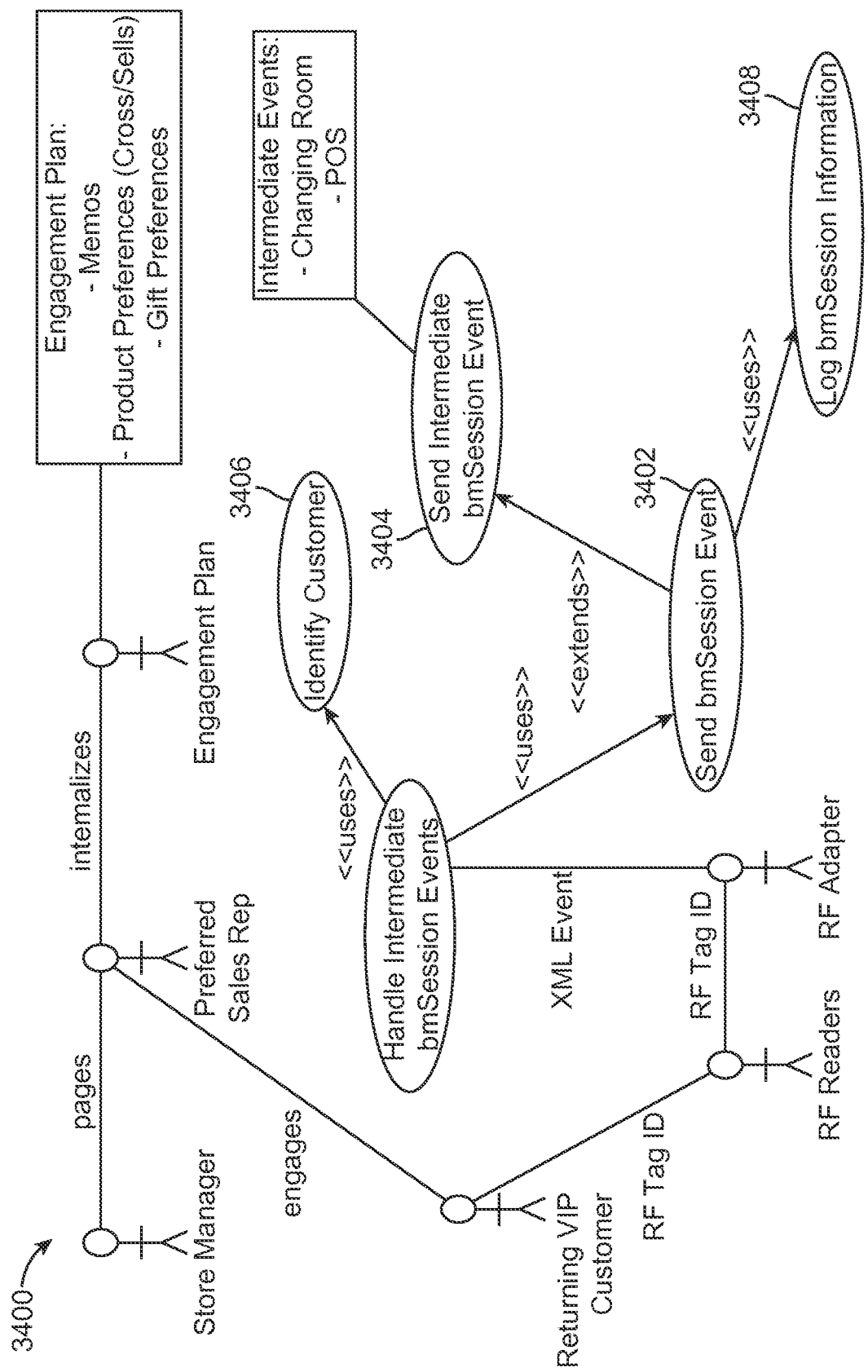
FIG. 34 is a flowchart of a scenario for engaging a return customer.

FIG. 34 is a flowchart of a scenario 3400 for engaging a return customer. This scenario starts when the Manager is notified of a VIP customer entering the store—the manager also has the engagement plan for the preferred customer. The manager obtains the preferred sales rep information from the engagement plan and pages the sales rep. The sales rep internalizes the engagement plan. The sales rep then engages with the customer. This scenario also captures intermediate session information, such as the customer entering and exiting a changing room, entering and leaving a department, and completing a purchase at the POS.

Use Case Titles and Descriptions

Title 3402: Send bmSession Event—This Use Case sends the bmSession event to the subscribers of the event.

Title 3404: Send Intermediate bmSession Event—This Use extends the bmSession event by sending intermediate session events such as entering and exiting changing rooms, entering and exiting departments etc.

Title 3406: Identify Customer—This Use Case uses the RFID signature to identify the customer.

Title 3408: Log bmSession Information—This Use Case logs the bmSession Information.

Scenario 5: Close a bmSession of a Returning Customer

Actors

| Actor: VIP Customer | Type of Actor: User |
|---|---|
| Actor: Manager | Type of Actor: User |
| Actor: RF Readers | Type of Actor: External System |
| Actor: RF Adapter | Type of Actor: External System |
| Actor: VIP Database/Corporate CRM | Type of Actor: External System |
| Actor: Printer | Type of Actor: External System |

Scenario Description

Figure 35:
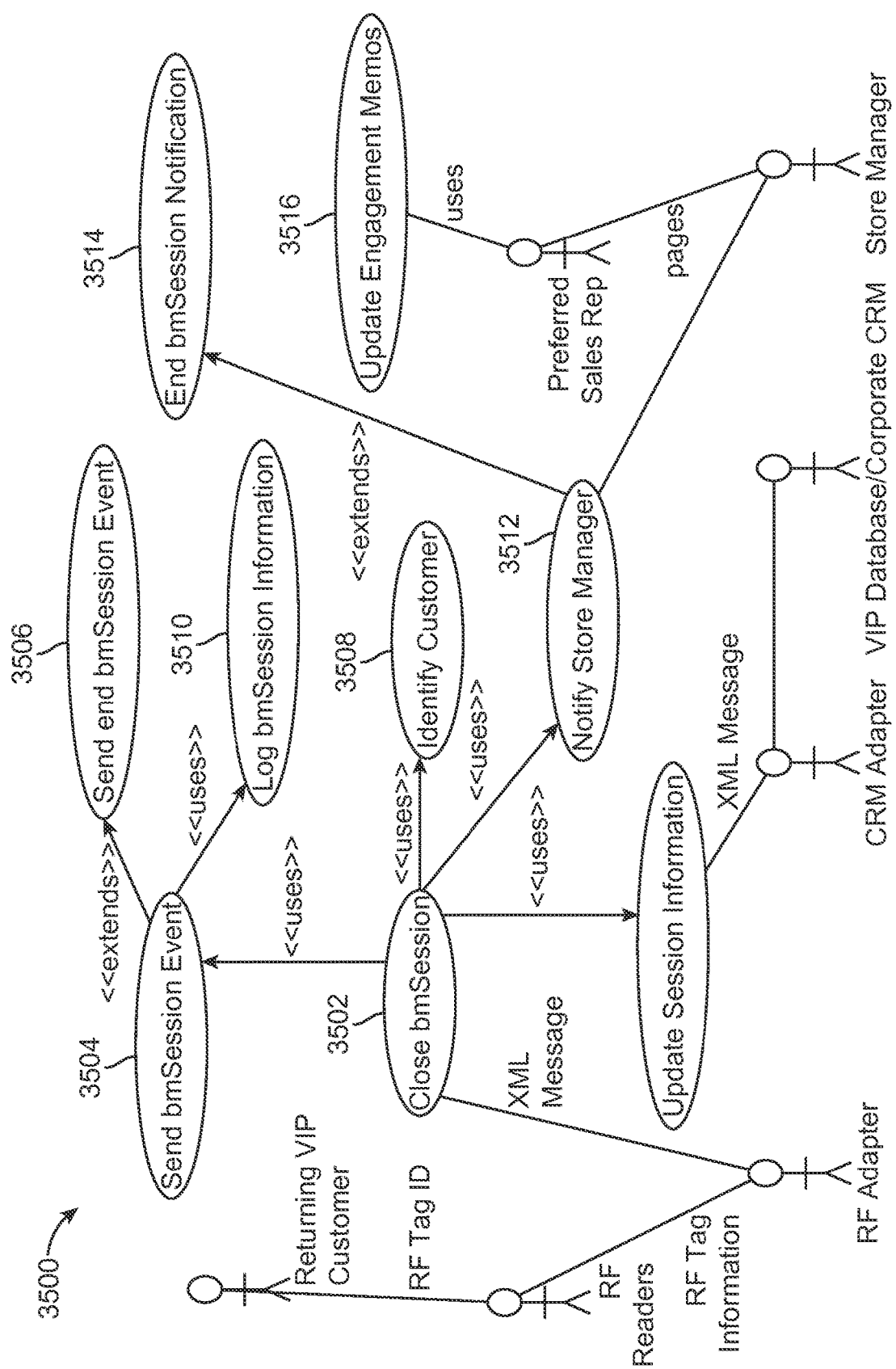
FIG. 35 is a flowchart of a scenario for closing a session.

FIG. 35 is a flowchart of a scenario 3500 for closing a session. This scenario starts when a VIP Customer leaves the store. The RF Reader sends the sensed RF Tag information to the bmIdentification module. The store manager is notified of the customer leaving. The scenario ends with the sales representative updating the data for the engagement plan of the customer.

Use Case Titles and Descriptions

Title 3502: Close bmSession—This Use Case handles the closure of a bmSession for the customer. It extends the Handle bmSession Use Case, which is the generic use case when any bmSession event occurs.

Title 3504: Send bmSession Event—This Use Case sends the bmSession event to the subscribers of the event.

Title 3506: Send End bmSession Event—This Use extends the bmSession event by sending the End Event.

Title 3508: Identify Customer—This Use Case uses the RFID signature to identify the customer.

Title 3510: Log bmSession Information—This Use Case logs the bmSession Information.

Title 3512: Notify Store Manager—This Use Case notifies the store manager of a bmSession event.

Title 3514: End bmSession Notification—This Use Case extends the Notify Store Manager Use case by notifying the store manager of the end bmSession event.

Title 3516: Update Engagement Memos—This Use Case is used by the Sales Representative to add engagement information pertaining to the last interaction.

Architecture

According to one embodiment, a TomCat WebServer with its Servlet Engine can be used. The overarching architectural follows the MVC paradigm where the Model, View and Controller are separated in an n-tier architecture.

If the deployment calls for a distributed architecture then the MVC paradigm implemented using TomCat can easily be moved to an MVC paradigm using a J2EE server. Essentially, the difference is that the distributed components can be implemented as EJB's—the Entity EJB's would then be the "model"

JSP Architectural Paradigms

The early JSP specifications advocated two philosophical approaches, popularly known as Model 1 and Model 2 architectures, for applying JSP technology. These approaches differ essentially in the location at which the bulk of the request processing was performed, and offer a useful paradigm for building applications using JSP technology.

Figure 36:
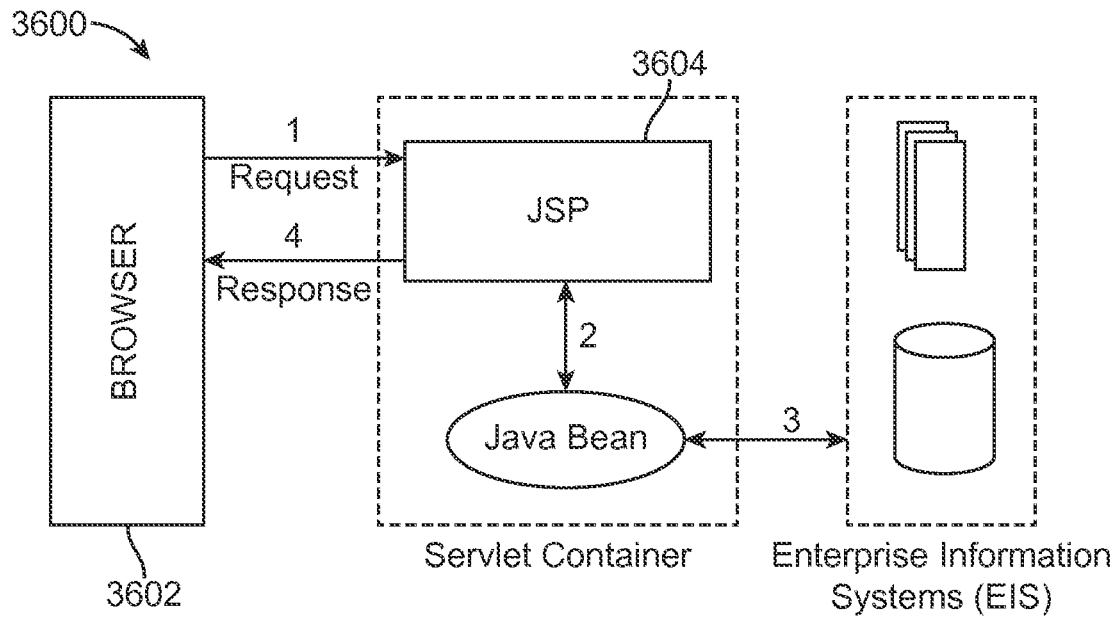
FIG. 36 is a system diagram of a wireless CRM system architecture according to one embodiment of the present invention.

Consider the Model 1 architecture 3600, shown in FIG. 36. In the Model 1 architecture, the incoming request from a web browser 3602 is sent directly to the JSP page 3604, which is responsible for processing it and replying back to the client. There is still separation of presentation from content, because all data access is performed using beans.

Although the Model 1 architecture is suitable for simple applications, it may not be desirable for complex implementations. Indiscriminate usage of this architecture usually leads to a significant amount of scriptlets or Java code embedded within the JSP page, especially if there is a significant amount of request processing to be performed. While this may not seem to be much of a problem for Java developers, it is certainly an issue if the JSP pages are created and maintained by designers—which is usually the norm on large projects. Another downside of this architecture is that each of the JSP pages must be individually responsible for managing application state and verifying authentication and security.

Figure 37:
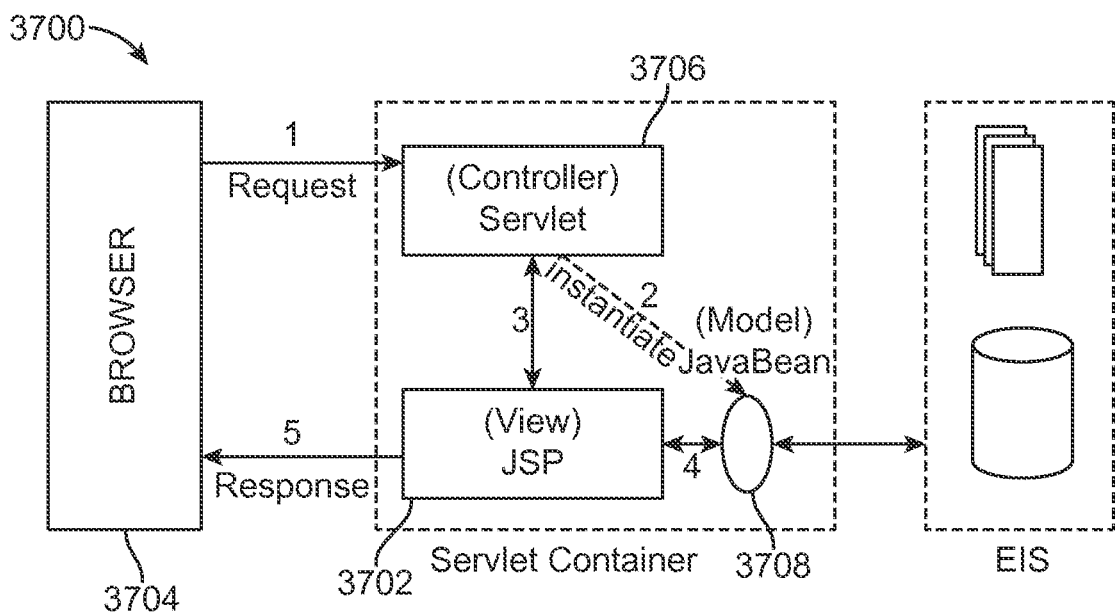
FIG. 37 is a system diagram of another wireless CRM system architecture according to one embodiment of the present invention.

The Model 2 architecture 3700, shown in FIG. 37, is a server-side implementation of the popular Model/View/Controller design pattern. Here, the processing is divided between presentation and front components. Presentation components 3702 are JSP pages that generate the HTML/XML response that determines the user interface when rendered by the browser 3704. Front components 3706 (also known as controllers) do not handle any presentation issues, but rather, process all the HTTP requests. Here, they are responsible for creating any beans 3708 or objects used by the presentation components, as well as deciding, depending on the user's actions, which presentation component to forward the request to. Front components can be implemented as either a servlet or JSP page.

The advantage of this architecture is that there is no processing logic within the presentation component itself; it is simply responsible for retrieving any objects or beans that may have been previously created by the controller, and extracting the dynamic content within for insertion within its static templates. Consequently, this clean separation of presentation from content leads to a clear delineation of the roles and responsibilities of the developers and page designers on the programming team. Another benefit of this approach is that the front components present a single point of entry into the application, thus making the management of application state, security, and presentation uniform and easier to maintain.

Figure 38:
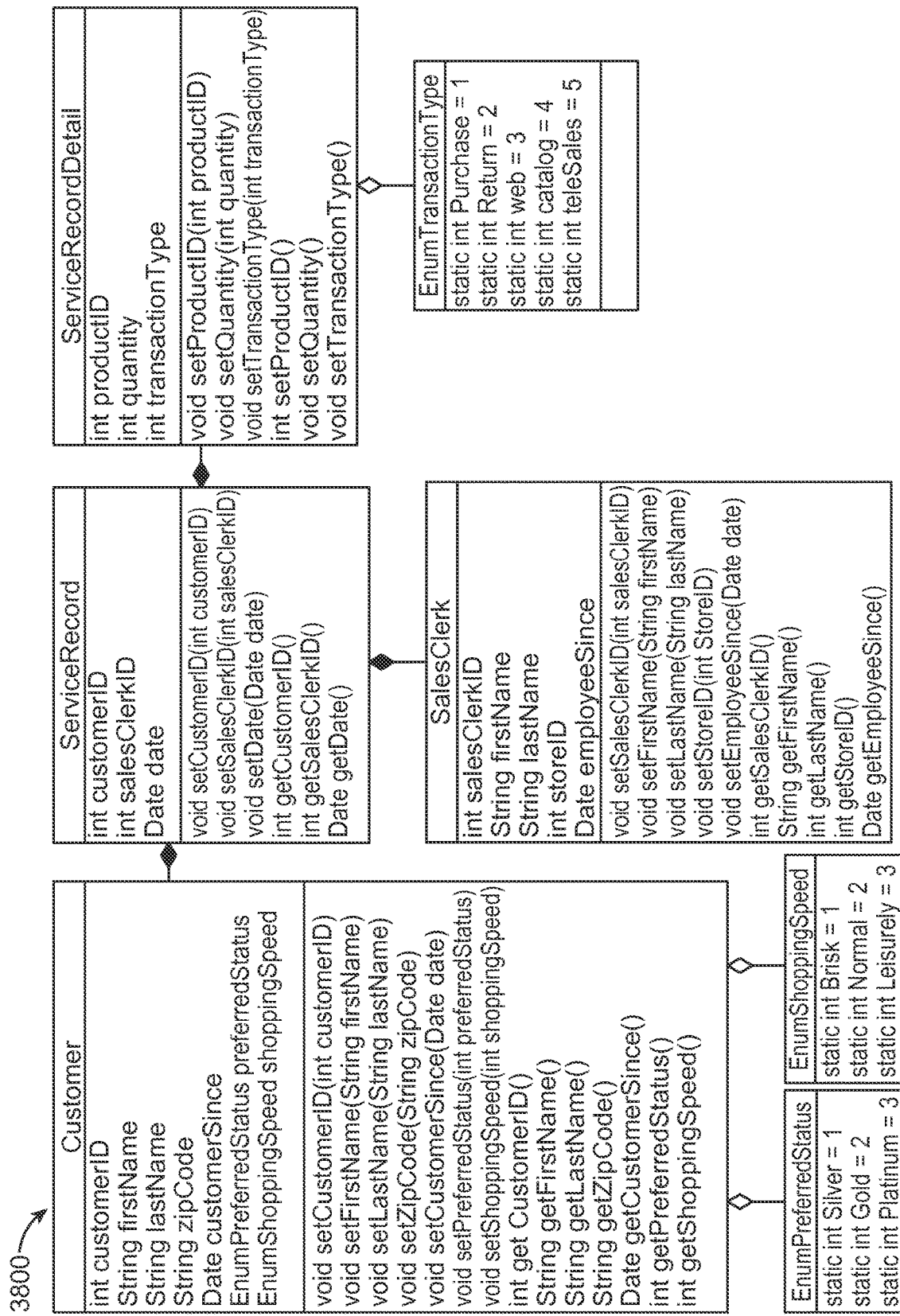
FIG. 38 is a class diagram showing exemplary classes pertaining to customer engagement.
Figure 39:
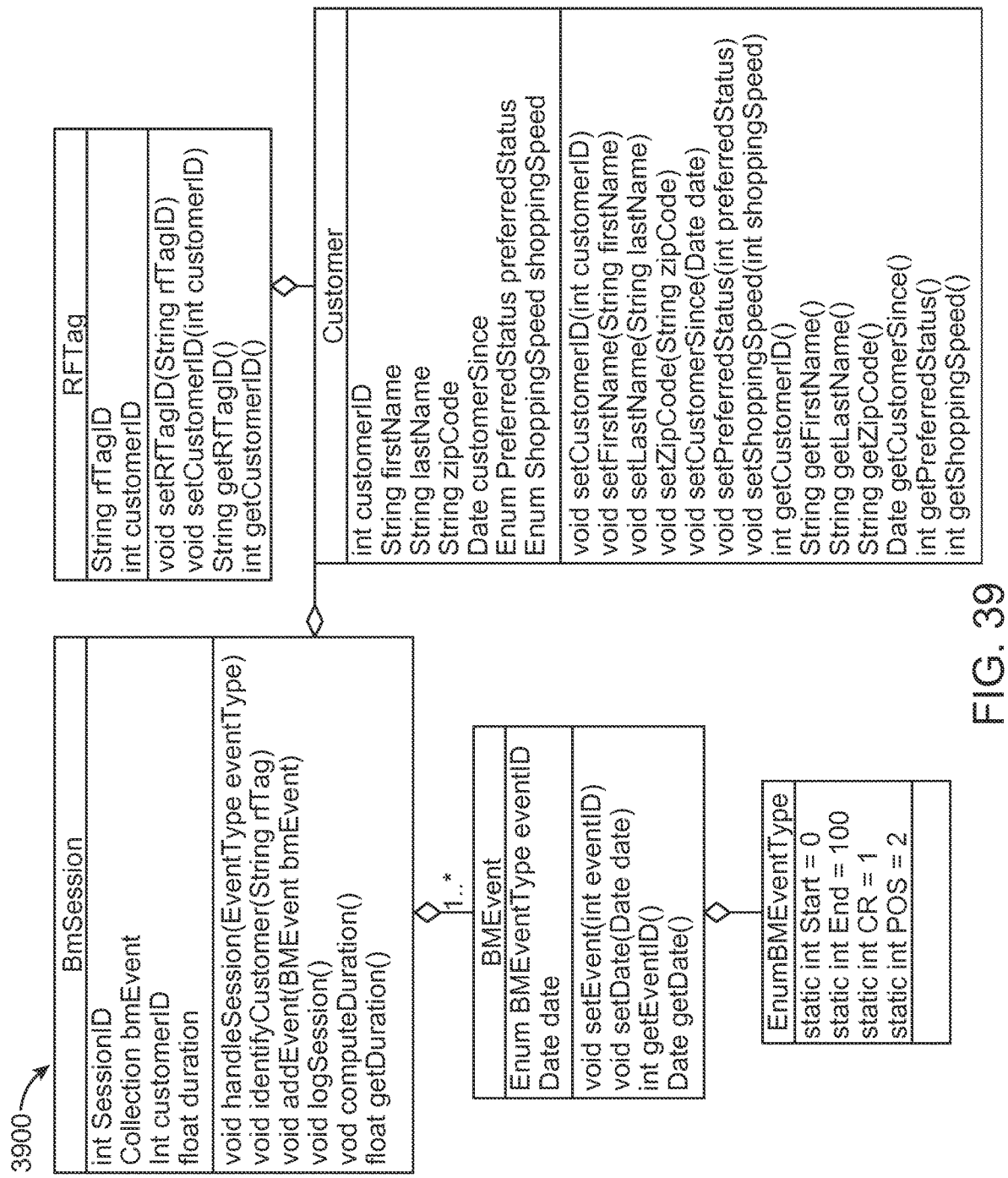
FIG. 39 is a class diagram depicting illustrative classes related to bmSessions.
Figure 40:
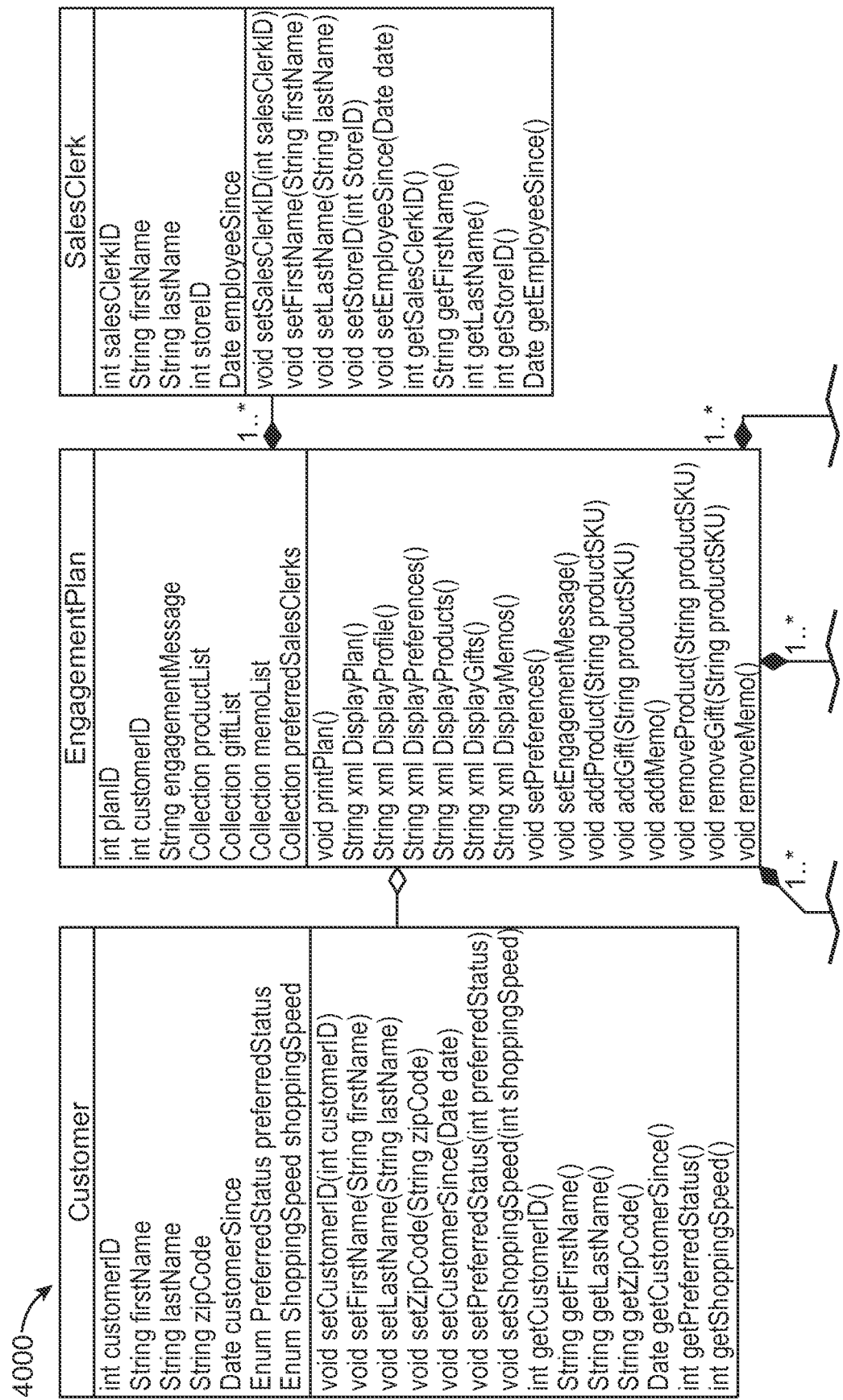
FIG. 40 is a class diagram illustrating exemplary classes related to an engagement plan.
Figure 40:
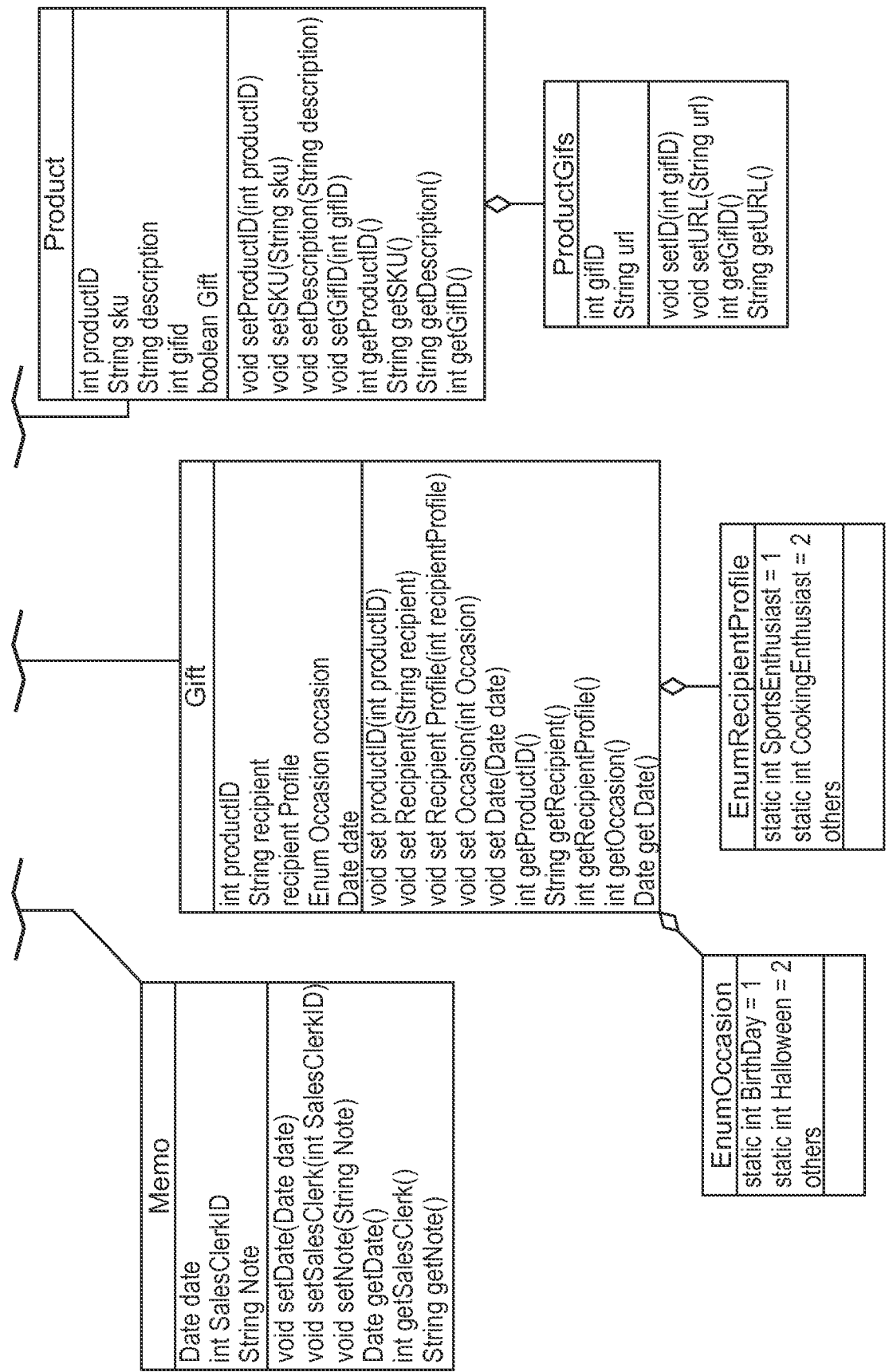

FIG. 38 is a class diagram 3800 showing exemplary classes pertaining to customer engagement. FIG. 39 is a class diagram 3900 depicting illustrative classes related to bmSessions. FIG. 40 is a class diagram 4000 illustrating exemplary classes related to an engagement plan.

According to one embodiment, four databases are used: CRM, POS, Inventory, and IP. The CRM database contains tables relating to customer information and customer preferences based on prior transactions. The POS database contains tables relating to POS transactions. The Inventory database contains the products and product picture information. The IP database contains tables pertaining to core IP, such as BM Session Information, BM Memos etc.

Overview of RFID
Benefits of RFID

The significant advantage of all types of RFID systems is the noncontact, non-line-of-sight nature of the technology. Tags can be read through a variety of substances such as snow, fog, ice, paint, crusted grime, and other visually and environmentally challenging conditions, where barcodes or other optically read technologies would be useless. RFID tags can also be read in challenging circumstances at remarkable speeds, in most cases responding in less than 100 milliseconds. The read/write capability of an active RFID system is also a significant advantage in interactive applications such as work-in-process or maintenance tracking. Though it is a costlier technology (compared with barcode), RFID has become indispensable for a wide range of automated data collection and identification applications that would not be possible otherwise.

RFID Technology Overview

A basic RFID system consist of three components:
An antenna or coil
A transceiver (with decoder)
A transponder (RF tag) electronically programmed with unique information The antenna emits radio signals to activate the tag and read and write data to it. Antennas are the conduits between the tag and the transceiver, which controls the system's data acquisition and communication. Antennas are available in a variety of shapes and sizes; they can be built into a door frame to receive tag data from persons or things passing through the door, or mounted on an interstate toll booth to monitor traffic passing by on a freeway. The electromagnetic field produced by an antenna can be constantly present when multiple tags are expected continually. If constant interrogation is not required, the field can be activated by a sensor device.

Often the antenna is packaged with the transceiver and decoder to become a reader (a.k.a. interrogator), which can be configured either as a handheld or a fixed-mount device. The reader emits radio waves in ranges of anywhere from one inch to 100 feet or more, depending upon its power output and the radio frequency used. When an RFID tag passes through the electromagnetic zone, it detects the reader's activation signal. The reader decodes the data encoded in the tag's integrated circuit (silicon chip) and the data is passed to the host computer for processing.

RFID Tags

RFID tags come in a wide variety of shapes and sizes. Animal tracking tags, inserted beneath the skin, can be as small as a pencil lead in diameter and one-half inch in length. Tags can be screw-shaped to identify trees or wooden items, or credit-card shaped for use in access applications. The anti-theft hard plastic tags attached to merchandise in stores are RFID tags. In addition, heavy-duty 5- by 4- by 2-inch rectangular transponders used to track intermodal containers or heavy machinery, trucks, and railroad cars for maintenance and tracking applications are RFID tags.

RFID tags are categorized as either active or passive. Active RFID tags are powered by an internal battery and are typically read/write, i.e., tag data can be rewritten and/or modified. An active tag's memory size varies according to application requirements; some systems operate with up to 1 MB of memory. In a typical read/write RFID work-in-process system, a tag might give a machine a set of instructions, and the machine would then report its performance to the tag. This encoded data would then become part of the tagged part's history. The battery-supplied power of an active tag generally gives it a longer read range. The trade off is greater size, greater cost, and a limited operational life (which may yield a maximum of 10 years, depending upon operating temperatures and battery type).

Passive RFID tags operate without a separate external power source and obtain operating power generated from the reader. Passive tags are consequently much lighter than active tags, less expensive, and offer a virtually unlimited operational lifetime. The trade off is that they have shorter read ranges than active tags and require a higher-powered reader. Read-only tags are typically passive and are programmed with a unique set of data (usually 32 to 128 bits) that cannot be modified. Read-only tags most often operate as a license plate into a database, in the same way as linear barcodes reference a database containing modifiable product-specific information.

RFID systems are also distinguished by their frequency ranges. Low-frequency (30 KHz to 500 KHz) systems have short reading ranges and lower system costs. They are most commonly used in security access, asset tracking, and animal identification applications. High-frequency (850 MHz to 950 MHz and 2.4 GHz to 2.5 GHz) systems, offering long read ranges (greater than 90 feet) and high reading speeds, are used for such applications as railroad car tracking and automated toll collection. However, the higher performance of high-frequency RFID systems incurs higher system costs.

Developments in RFID technology continue to yield larger memory capacities, wider reading ranges, and faster processing. It is highly unlikely that the technology will ultimately replace barcode—even with the inevitable reduction in raw materials coupled with economies of scale, the integrated circuit in an RF tag will never be as cost-effective as a barcode label. However, RFID will continue to grow in its established niches where barcode or other optical technologies are not effective. If some standards commonality is achieved—whereby RFID equipment from different manufacturers can be used interchangeably—the market will very likely grow exponentially.

Attributes of RFID Technology
Frequency

Three frequency ranges are generally distinguished for RFID systems, low, intermediate (medium) and high. The following table summarizes these three frequency ranges, along with the typical system characteristics and examples of major areas of application.

TABLE 1

Frequency Bands and Applications

| Frequency Band | Operating Principle | Characteristics | Typical Applications |
| --- | --- | --- | --- |
| Low<br>100-500 kHz | Magnetic Induction | Short to medium read range<br>Inexpensive<br>low reading speed | Access control<br>Animal identification<br>Inventory control |
| Intermediate<br>10-15 MHz | Magnetic Induction | Short to medium read range<br>potentially inexpensive<br>medium reading speed | Access control<br>Smart cards |

TABLE 1-continued

Frequency Bands and Applications

| Frequency Band | Operating Principle | Characteristics | Typical Applications |
|---|---|---|---|
| High 850-950 MHz 2.4-5.8 GHz | Electro-magnetic wave propagation | Long read range High reading speed Line of sight required Expensive | Railroad car monitoring Toll collection systems |

A degree of uniformity is being sought for carrier frequency usage, through three regulatory areas, Europe and Africa (Region 1), North and South America (Region 2) and Far East and Australia (Region 3). Each country manages their frequency allocations within the guidelines set out by the three regions. Unfortunately, there has been little or no consistency over time with the allocation of frequency, and so there are very few frequencies that are available on a global basis for the technology. This will change with time, as countries are required to try to achieve some uniformity by the year 2010.

Three carrier frequencies receiving early attention as representative of the low, intermediate and high ranges are 125 kHz, 13.56 MHz and 2.45 GHz. However, there are eight frequency bands in use around the world, for RFID applications. The applications using these frequency bands are listed in Table 2.

Not all of the countries in the world have access to all of the frequency bands listed above, as some countries have assigned these bands to other users. Within each country and within each frequency range there are specific regulations that govern the use of the frequency. These regulations may apply to power levels and interference as well as frequency tolerances.

Pros and Cons of Three Different Frequencies
<150 kHz (125 kHz & 134 kHz)
  Advantages:
  Uses normal CMOS processing—basic and ubiquitous
  Relative freedom from regulatory limitations
  Well suited for applications requiring reading small amounts of data at slow speeds and minimal distances
  Penetrates materials well (water, tissue, wood, aluminum)
  Disadvantages:
  Does not penetrate or transmit around metals (iron, steel)
  Handles only small amounts of data
  Slow read speeds
  Large Antennas—compared to higher frequencies
  Minimal Range
  Tag construction:
  is thicker (than 13.56 MHz)
  is more expensive (than 13.56 MHz)
  more complex (requires more turns of the induction coil)
13.56 MHz
  Advantages
  Uses normal CMOS processing—basic and ubiquitous
  Well suited for applications requiring reading small amounts of data and minimal distances
  Penetrates water/tissue well

TABLE 2

Frequency Bands and Applications

| Frequency range | Applications and comments |
|---|---|
| Less than 135 kHz | A wide range of products available to suit a range of applications, including animal tagging, access control and track and traceability. Transponder systems which operate in this band do not need to be licensed in many countries. |
| 1.95 MHz, 3.25 MHz, 4.75 MHz, and 8.2 MHz | Electronic article surveillance (EAS) systems used in retail stores |
| Approx. 13 MHz, 13.56 MHz | EAS systems and ISM (Industrial Scientific and Medical) |
| Approx. 27 MHz | ISM applications |
| 430-460 MHz | ISM applications specifically in Region 1 |
| 902-916 MHz | ISM applications specifically in Region 2. In the USA this band is well organized with many different types of applications with different levels of priorities. This includes Railcar and Toll road applications. The band has been divided into narrow band sources and wide band (spread spectrum type) sources. In Region 1 the same frequencies are used by the GSM telephone network. |
| 918-926 MHz | RFID in Australia for transmitters with EIRP less than 1 watt |
| 2350-2450 MHz | A recognized ISM band in most parts of the world. IEEE 802.11 recognizes this band as acceptable for RF communications and both spread spectrum and narrow band systems are in use. |
| 5400-6800 MHz | This band is allocated for future use. The FCC have been requested to provide a spectrum allocation of 75 MHz in the 5.85-5.925 GHz band for Intelligent Transportation Services use. In France the TIS system is based on the proposed European pre-standard (preENV) for vehicle to roadside communications communicating with the roadside via microwave beacons operating at 5.8 GHz. |

Simpler antenna design (fewer turns of the coil); lower costs to build

Higher data rate (than 125 kHz—but slower than higher MHz systems)

Thinner tag construction (than 125 kHz)

Disadvantages

Government regulated frequency (U.S. versus Europe)

Does not penetrate or transmit around metals (unless very thick)

Large Antennas (compared to higher frequencies)

Larger tag size than higher frequencies

Tag construction: requires more than one surface to complete a circuit

Minimal Range

>400 MHz<1 GHz

Advantages

Effective around metals

Best available frequency for distances of >1 m

Tag size smaller than 13.56 MHz

Smaller antennas

Range: licensed to 20-40' with reasonable sized tag (stamp to eraser size)

Good non-line-of-sight communication (except for conductive, "lossy" materials)

High data rate; Large amounts of Data

Controlled read zone (through antenna directionality)

>400 MHz<1 GHz

Disadvantages

Does not penetrate water/tissue

Regulatory issues (not available in many countries)

Regulatory issues in Europe (similar band~869 MHz requires dual-freq chip)

DSI III recommends 862 to 870 MHz in the EU, may not be available elsewhere

Range

The range that can be achieved in an RFID system is essentially determined by:

The power available at the reader/interrogator to communicate with the tag(s)

The power available within the tag to respond

The environmental conditions and structures, the former being more significant at higher frequencies including signal to noise ratio The frequency Although the level of available power is the primary determinant of range the manner and efficiency in which that power is deployed also influences the range. The field or wave delivered from an antenna extends into the space surrounding it and its strength diminishes with respect to distance. The antenna design will determine the shape of the field or propagation wave delivered, so that range will also be influenced by the angle subtended between the tag and antenna.

The impact of frequency on Range is tabulated below:

TABLE 3

| Frequency Band and Range | |
| --- | --- |
| Frequency Band | Range |
| Low 100-500 kHz | Short to medium read range Inexpensive low reading speed |

TABLE 3-continued

| Frequency Band and Range | |
| --- | --- |
| Frequency Band | Range |
| Intermediate 10-15 MHz | Short to medium read range potentially inexpensive medium reading speed |
| High 850-950 MHz 2.4-5.8 GHz | Long read range High reading speed Line of sight required Expensive |

Environmental Factors

RFID Characteristics and Effects of Environmental Factors

FIG. 41 is a table 4100 from http://www.omron.com/card/rfid/faq/004.htm listing characteristics of various types of RFID systems that can be used with embodiments of the present invention.

Environmental Electrical Noise

If there is environmental electrical noise (RFI) in the location of the Antenna system, some reduction in the read performance may result. This RFI could be caused by:

a) Other transmitters in the location b) Inverters on drives and motors c) Electrical noise generated by moving equipment such as conveyors d) Noise associated with the power supply, especially Switched Mode Power Supplies.

Shielding the antenna is often an effective way to reduce or overcome such issues. This has benefits because it not only stops the RFI but it also stops any interference generated by the Reader affecting other equipment. The shield also stops transponders (XP), which are not in the read zone from being read. A shield also allows higher power levels to be used and still keep within the regulatory limits.

Preferred RFID Systems

Floor mounted systems are preferred because they do not pose any aesthetic restrictions for a BM establishment. In addition, since the RFID card will be carried primarily in wallets and purses their distance from the floor should not exceed 1 meter in most cases—1.5 meter read range should be more than adequate, and can be achieved by placing two 0.75 meter read range antennas at opposite sides of a doorway.

Passive Tags may be used to eliminate the need for customers to replace batteries on an active tag.

A long range contactless 13.56 MHz RF coupler can be used. The preferred long range coupler is designed to provide long distance communication between the host and a range of contactless chips, including INSIDE's PicoTag and any other ISO 15693 compliant product. Preferred general specifications of the coupler are:

Operating frequency 13.56 MHz

Operating temp° −20° C. to +70° C.

Physical dimensions 150×160 mm

Operating distance up to 150 cm (Depending on the type of transponder and antenna)

Interfaces

Host interfaces RS232/RS485

Baud rate Default 9600 bps (up to 115.2K bps)

Supported ISO 15693 contactless standards

The Read/Write Antennas, such as the HS500-Series Read/Write Antennas, provide an interface between a Read/Write RFID Controller and the data in the HS-Series Read/Write Tags. The antennas can transfer data at about 3000 bytes per second. Most importantly these tags can read/write data through virtually any non-conductive material and are unaffected by paint, dust, dirt and solvents. The compact size and long range of the antenna makes it ideal for use in commercial settings, where space is at a premium.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for utilizing customer relationship management (CRM) protocol within one or more brick and mortar retailers (BMR) for a plurality of customers, each in possession of a wireless device, the method comprising steps of:
installing in each of the one or more BMR a system for recognizing and interacting with wireless devices and maintaining a CRM engagement plan for each of the plurality of customers;
recognizing, by the system, presence and identity of the wireless devices in possession of the each of the plurality of customers;
initiating and ending, by the system, a customer in-store session for each of the plurality of customers when their respective wireless devices are recognized as present and as no longer present in the one or more BMR, respectively;
receiving, by the system from the recognized wireless device, locations of the wireless devices within the one or more BMR;
until the recognized wireless devices are no longer present in the one or more BMR:
tracking, by the system, events concerning the plurality of customers based on the received locations, the events including at least one of:
departments or sections of the one or more BMR visited,
amounts of time spent in the visited departments or sections,
products near which the amounts of time was spent, and the products handled by the plurality of customers;
determining, by the system, analytics based on the events, the analytics including at least one of:
patterns representing movement through the one or more BMR,
amounts of time spent in the one or more BMR,
sections of the one or more BMR that attract a greatest number of the plurality of customers, and
sections of the one or more BMR in which the plurality of customers spend a greatest amount of time;
correlating, by the system, the tracked events (i) to customer spending by the plurality of customers, and (ii) to respective marketing campaigns;
comparing, by the system, the analytics determined during a period when the respective marketing campaign is in effect and during a corresponding period when the marketing campaign is not in effect; and
creating and maintaining, by the system based on the analytics, the CRM engagement plan for each of the plurality of customers.

2. The method of claim 1, wherein the CRM engagement plan for each of the plurality of customers is created based on the customer's profile, preferences and transaction history.

3. The method of claim 2, further comprising a step of: determining, by the system, a correlation between the profile and events for the customer.

4. The method of claim 3, further comprising a step of: determining, by the system, the product or department of most interest to the customer based on the correlation.

5. The method of claim 1, wherein the step of determining analytics further comprises a step of: determining, by the system, including at least one of a frequency of purchase transactions by the customer, a measure of how recent a last purchase transaction by the customer occurred, and an amount of money spent by the customer.

6. The method of claim 5, further comprising the step of: displaying, by the system, a correlation between at least one of the events and the amount of money spent by the customer over a period of time.

7. The method of claim 6, wherein the correlation relates at least one event within a particular department or section of the one or more BMR and the amount of money spent by the customer with respect to the particular department or section of the one or more BMR.

8. The method of claim 1, wherein the events further include times of entry and exit of the one or more BMR by the customers.

9. The method of claim 1, wherein the compared analytics are based on events within a specific department or section of the one or more BMR associated with the marketing campaign.

10. The method of claim 1, further comprising the step of: determining a product placement of a product based on the analytics.

11. The method of claim 1, further comprising the step of: determining a promotion offer based on the analytics.

12. The method of claim 11, wherein the analytics relate to a particular department or section of the one or more BMR and wherein the promotion offer is for the particular department or section.

13. A non-transitory computer-readable storage medium storing instructions, which when executed by a computer, cause the computer to perform a method for utilizing customer relationship management (CRM) protocol within one or more brick and mortar retailers (BMR) for a plurality of customers, each in possession of a wireless device, the method comprising steps of:
recognizing, by a system installed in each of the one or more BMR for recognizing and interacting with wireless devices and maintaining a CRM engagement plan for each of the plurality of customers, presence and identity of the wireless devices in possession of the each of the plurality of customers;
initiating and ending, by the system, a customer in-store session for each of the plurality of customers when their respective wireless devices are recognized as present and as no longer present in the one or more BMR, respectively;
receiving, by the system from the recognized wireless device locations of the wireless devices within the one or more BMR;
until the recognized wireless devices are no longer present in the one or more BMR:
tracking, by the system, events concerning the plurality of customers based on the received locations, the events including at least one of:
departments or sections of the one or more BMR visited,
amounts of time spent in the visited departments or sections, products near which the amounts of time was spent, and the products handled by the plurality of customers;

determining, by the system, analytics based on the events, the analytics including at least one of:
- patterns representing movement through the one or more BMR,
- amounts of time spent in the one or more BMR,
- sections of the one or more BMR that attract greatest numbers of the plurality of customers, and
- sections of the one or more BMR in which the plurality of customers spend a greatest amounts of time;

correlating, by the system, the tracked events (i) to customer spending by the plurality of customers, and (ii) to respective marketing campaigns;

comparing, by the system, the analytics determined during a period when the respective marketing campaign is in effect and during a corresponding period when the marketing campaign is not in effect; and creating and maintaining, by the system based on the analytics, the CRM engagement plan for each of the plurality of customers.

14. The non-transitory computer-readable storage medium of claim 13, wherein the CRM engagement plan for each of the plurality of customers is created based on the customer's profile, preferences and transaction history.

15. The non-transitory computer-readable storage medium of claim 13, wherein the step of determining analytics further comprises a step of: determining, by the system, at least one of a frequency of purchase transactions by the customer, a measure of how recent a last purchase transaction by the customer occurred, and an amount of money spent by the customer.

16. The non-transitory computer-readable storage medium of claim 15, further comprising the step of: displaying, by the system, a correlation between at least one of the events and the amount of money spent by the customer over a period of time.

17. The non-transitory computer-readable storage medium of claim 16, wherein the correlation relates at least one event within a particular department or section of the one or more BMR and the amount of money spent by the customer with respect to the particular department or section of the one or more BMR.

18. The non-transitory computer-readable storage medium of claim 13, wherein the events further include times of entry and exit of the one or more BMR by the customers.

19. The non-transitory computer-readable storage medium of claim 13, further comprising the step of: determining a promotion to offer based on the analytics.

20. A method for utilizing customer relationship management (CRM) protocol within one or more brick and mortar retailers (BMR) for a plurality of customers, each in possession of a wireless device, the method comprising steps of:
- installing in each of the one or more BMR a system for recognizing and interacting with wireless devices and maintaining a CRM engagement plan for each of the plurality of customers;
- recognizing, by the system, presence and identity of the wireless devices in possession of the each of the plurality of customers;
- initiating and ending, by the system, a customer in-store session for each of the plurality of customers when their respective recognized wireless devices are recognized as present and as no longer present in the one or more BMR, respectively;
- receiving, by the system from the recognized wireless device while the customer in-store session is active, locations of the wireless device within the one or more BMR;
- until the recognized wireless devices are no longer present in the one or more BMR:
  - tracking, by the system, events concerning the plurality of customer based on the received locations, the events including at least one of:
    - departments or sections of the one or more BMR visited,
    - amounts of time spent in the visited departments or sections,
    - products near which the amounts of time was spent, and the products handled by the plurality of customer;
  - determining, by the system, analytics based on the events, the analytics including at least one of:
    - pattern representing movement through the one or more BMR,
    - an amount of time spent in the one or more BMR, and
    - sections of the one or more BMR in which the plurality customer spent greatest amounts of time;
  - correlating, by the system, the tracked events (i) to customer spending by the plurality of customers, and (ii) to respective marketing campaigns;
  - comparing, by the system, the analytics determined during a period when the respective marketing campaign is in effect and during a corresponding period when the marketing campaign is not in effect;
  - creating and maintaining, by the system based on the analytics, the CRM engagement plan for each of the plurality of customers; and
  - displaying, by the system, the CRM engagement plan and one or more representations of the analytics.

* * * * *